United States Patent
Lee

(10) Patent No.: US 8,613,379 B2
(45) Date of Patent: *Dec. 24, 2013

(54) SCOOTER DEVICE MOUNTING ASSEMBLY

(71) Applicant: Michael F. Lee, Windermere, FL (US)

(72) Inventor: Michael F. Lee, Windermere, FL (US)

(73) Assignee: High Gear Specialties, Inc., Winter Garden, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/733,416

(22) Filed: Jan. 3, 2013

(65) Prior Publication Data

US 2013/0134196 A1 May 30, 2013

Related U.S. Application Data

(63) Continuation-in-part of application No. 13/351,260, filed on Jan. 17, 2012, which is a continuation-in-part of application No. 12/711,767, filed on Feb. 24, 2010, now Pat. No. 8,261,954.

(51) Int. Cl.
*B60R 7/04* (2006.01)

(52) U.S. Cl.
USPC .......................... 224/282; 224/553; 224/558

(58) Field of Classification Search
USPC ......... 224/282, 276, 420, 441, 443, 448, 452, 224/454, 548, 553, 558, 929, 197, 200, 224/564; 403/165, 195, 196, 256, 310, 312, 403/313, 109.5, 109.3, 97, 78, 71, 87, 316, 403/96, 315, 319
See application file for complete search history.

(56) References Cited

U.S. PATENT DOCUMENTS

| | | |
|---|---|---|
| 111,152 A | 1/1871 | Smith |
| 2,447,080 A | 8/1948 | Meier |
| 2,664,259 A | 12/1953 | Rose |
| 2,922,669 A | 1/1960 | Hansen |
| 3,734,439 A | 5/1973 | Wintz |
| 3,851,983 A | 12/1974 | MacKenzie |
| 5,109,411 A | 4/1992 | O'Connell |
| 5,114,060 A | 5/1992 | Boyer |
| 5,260,731 A | 11/1993 | Baker, Jr. |
| 5,522,527 A | 6/1996 | Tsai |
| 5,661,942 A | 9/1997 | Palmer |
| 5,816,732 A | 10/1998 | Nissen |
| 5,941,488 A | 8/1999 | Rosen |
| 5,980,149 A | 11/1999 | Colclough et al. |
| 6,317,497 B1 | 11/2001 | Ou |
| 6,378,815 B1 | 4/2002 | Lee |
| 6,522,748 B1 | 2/2003 | Wang |
| 6,561,400 B2 | 5/2003 | Lee |
| 6,945,441 B2 | 9/2005 | Gates et al. |
| D566,648 S | 4/2008 | Lee |
| 2005/0006542 A1 | 1/2005 | Henning et al. |
| 2008/0179478 A1 | 7/2008 | Lee |

FOREIGN PATENT DOCUMENTS

GB   1 242 484 A   8/1971
WO   2008/112687 A1  9/2008

*Primary Examiner* — Justin Larson
(74) *Attorney, Agent, or Firm* — GrayRobinson, P.A.

(57) ABSTRACT

A device mounting assembly particularly intended for connection to the mirror mount of a motorized scooter so that a portable device such as a cellular telephone may be positioned for ready access by the rider of the scooter includes a severable pin connection at the location where the assembly is coupled to the vehicle and/or to a portable device wherein the pin connections help resist relative movement at such locations under normal operating conditions of the vehicle but may be severed in response to the application of a sufficient force to the assembly to resist disengagement of the portable device from the vehicle.

23 Claims, 18 Drawing Sheets

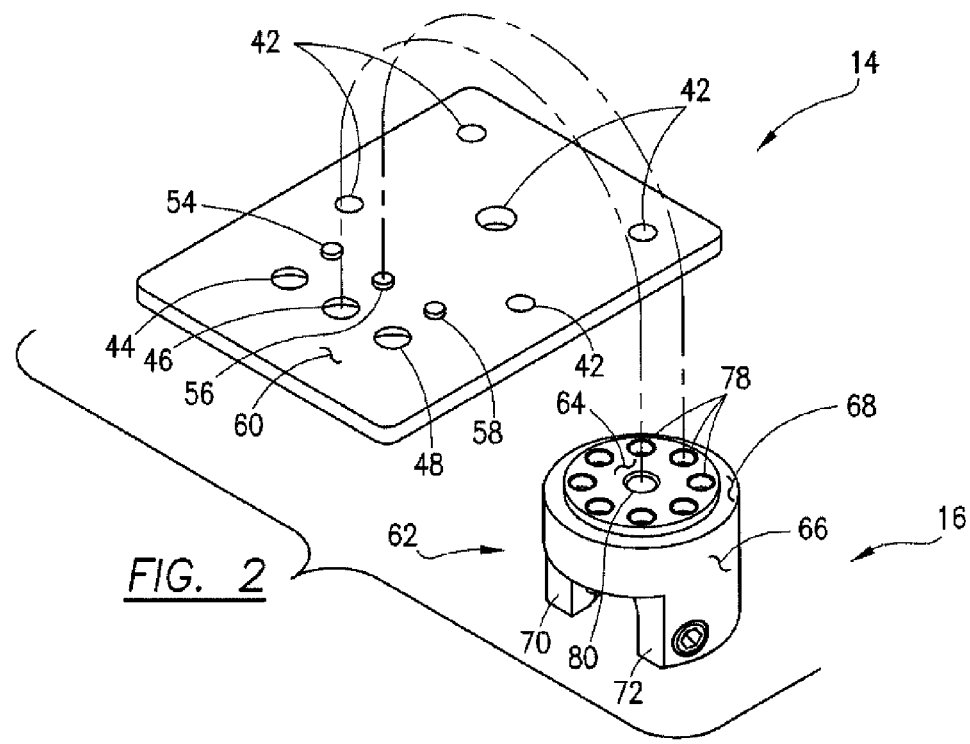
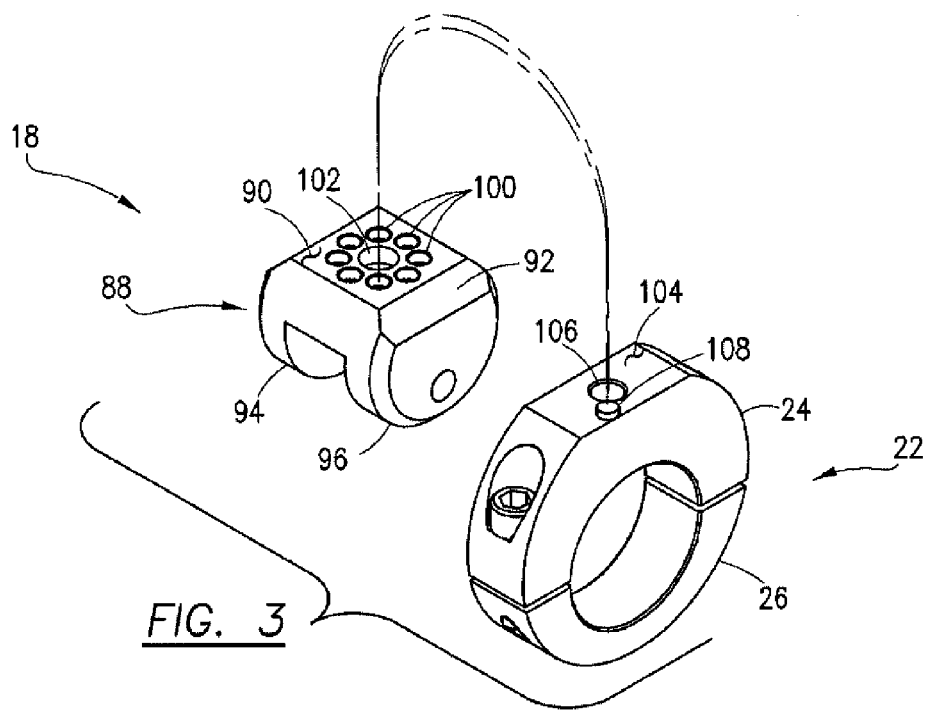

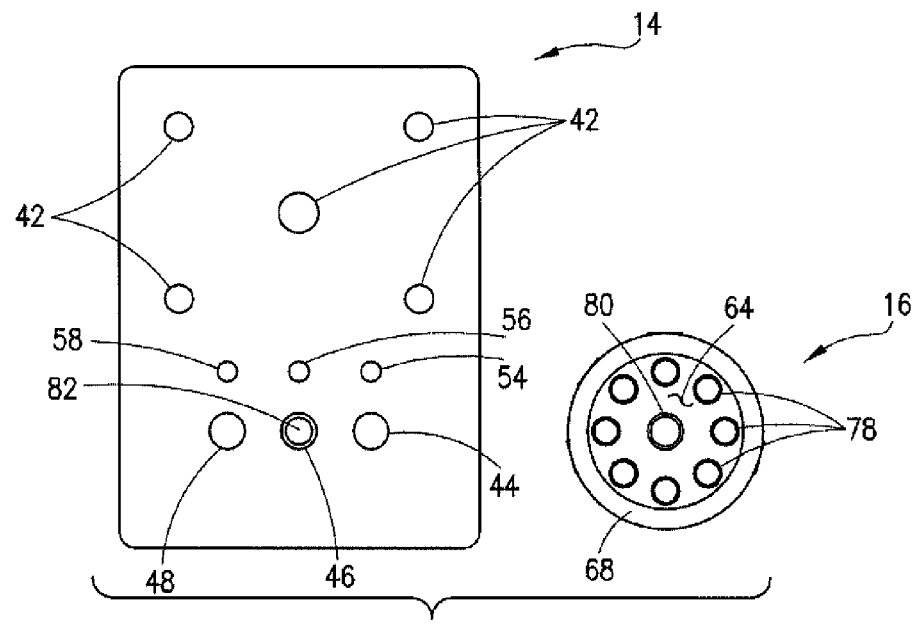
*FIG. 4*
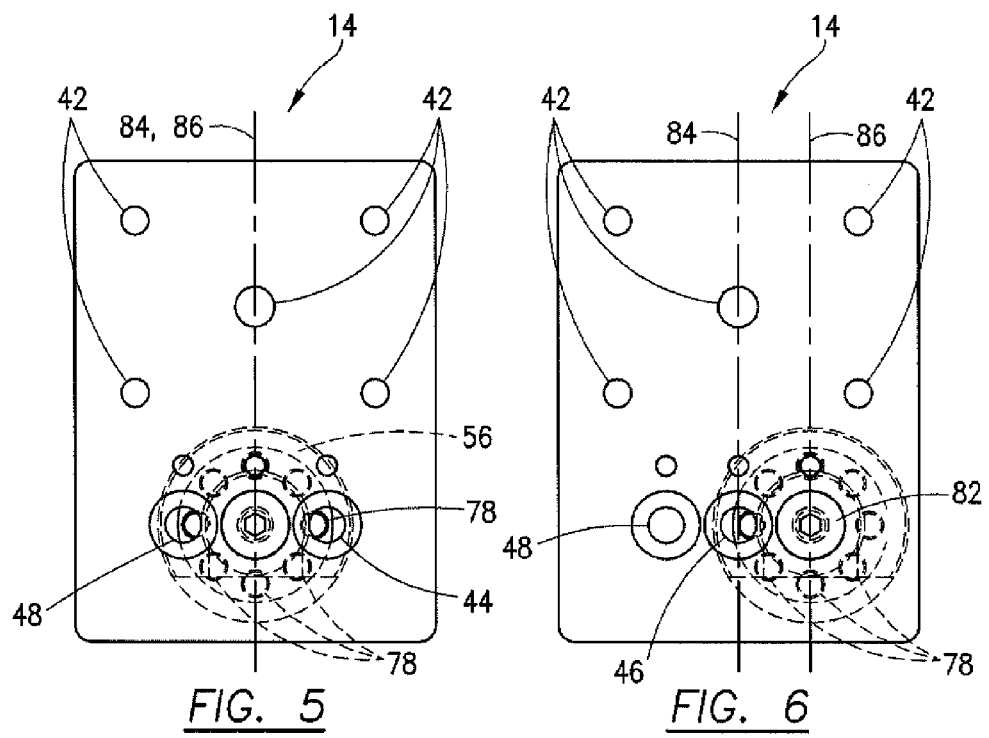
*FIG. 5*  *FIG. 6*

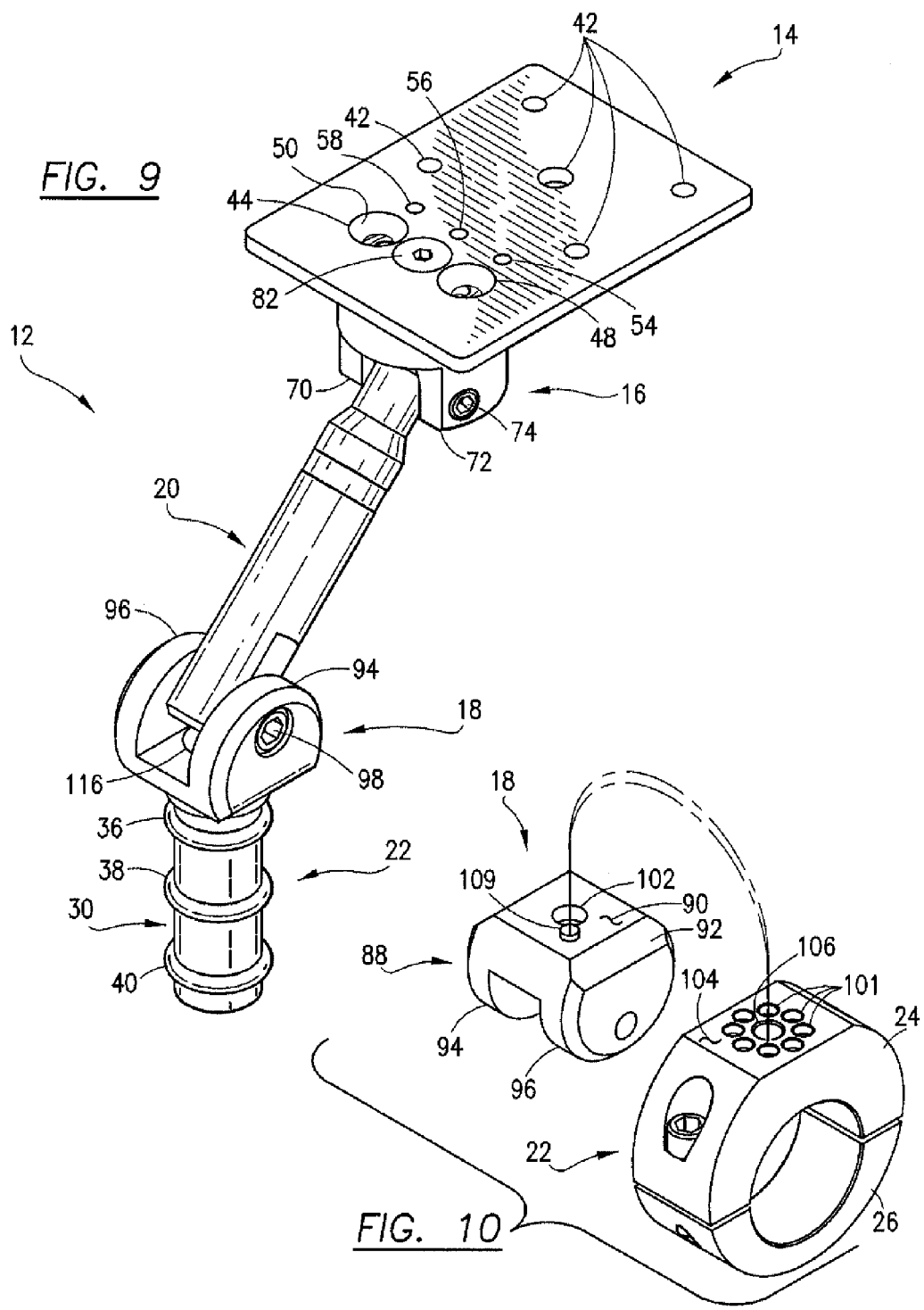

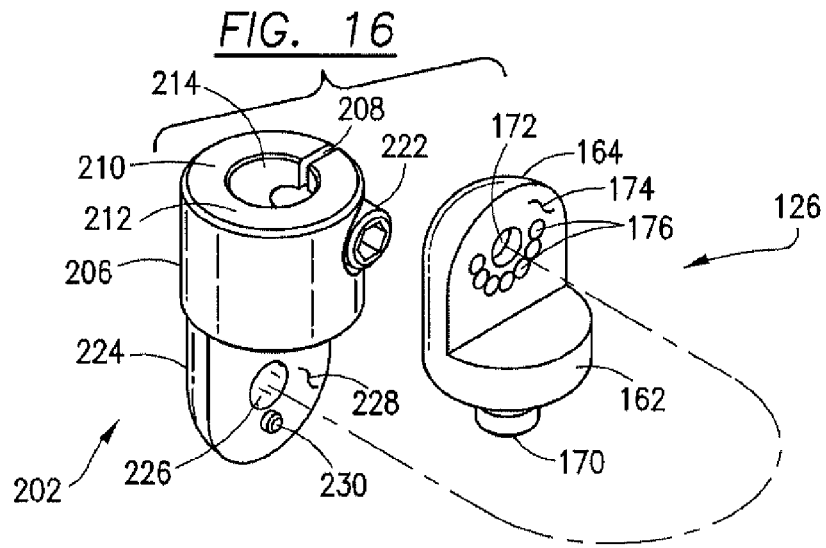
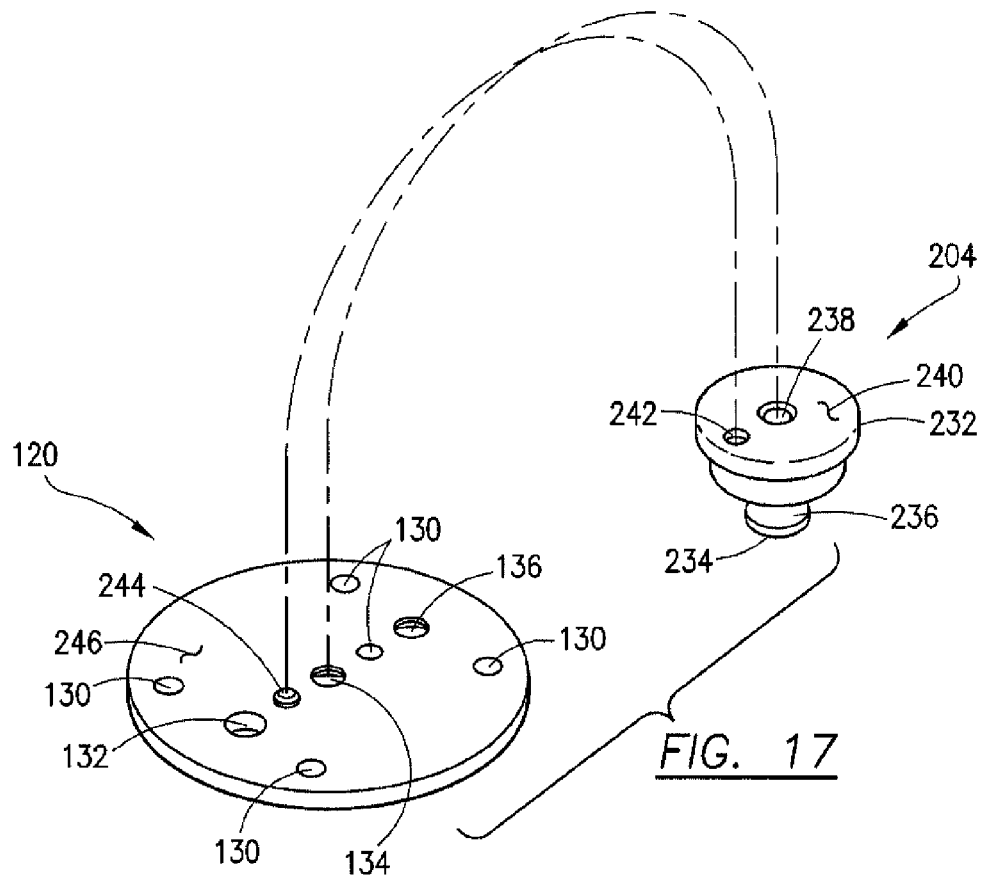

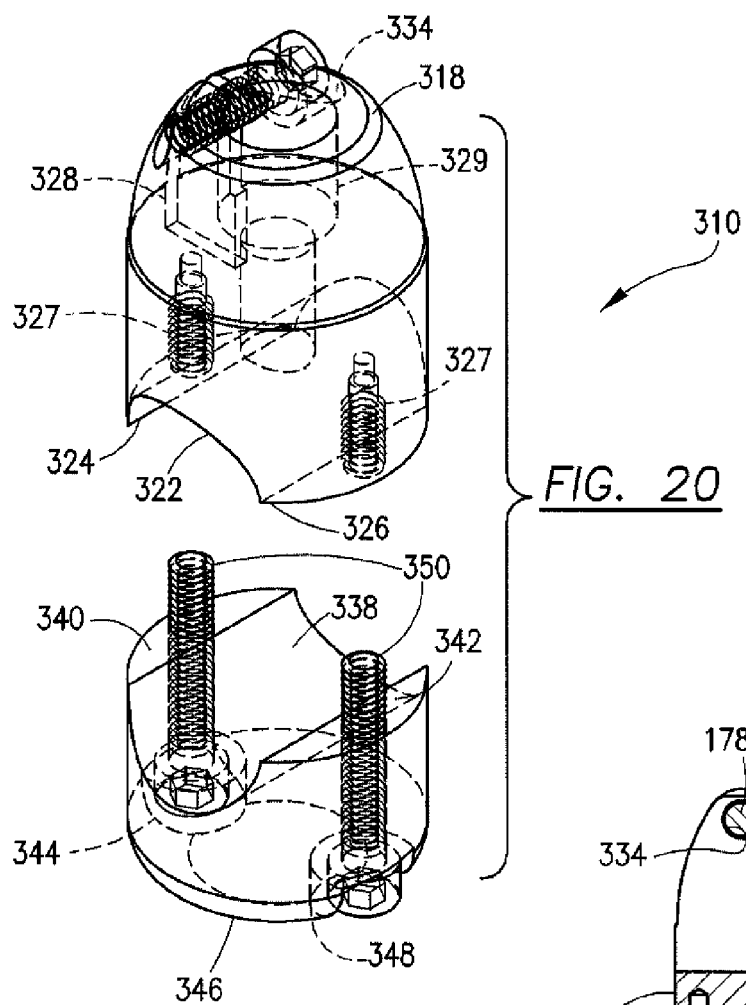
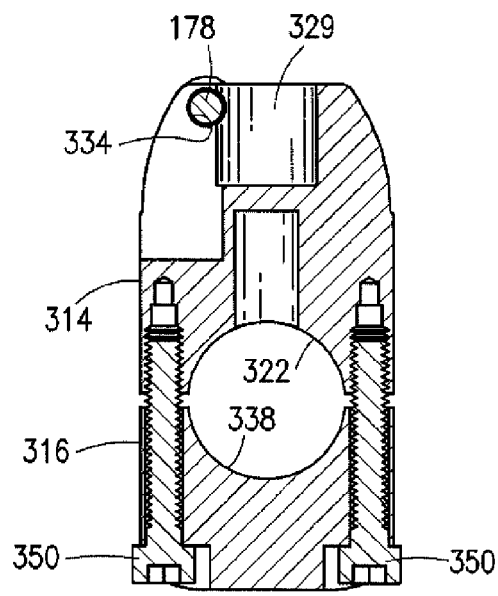

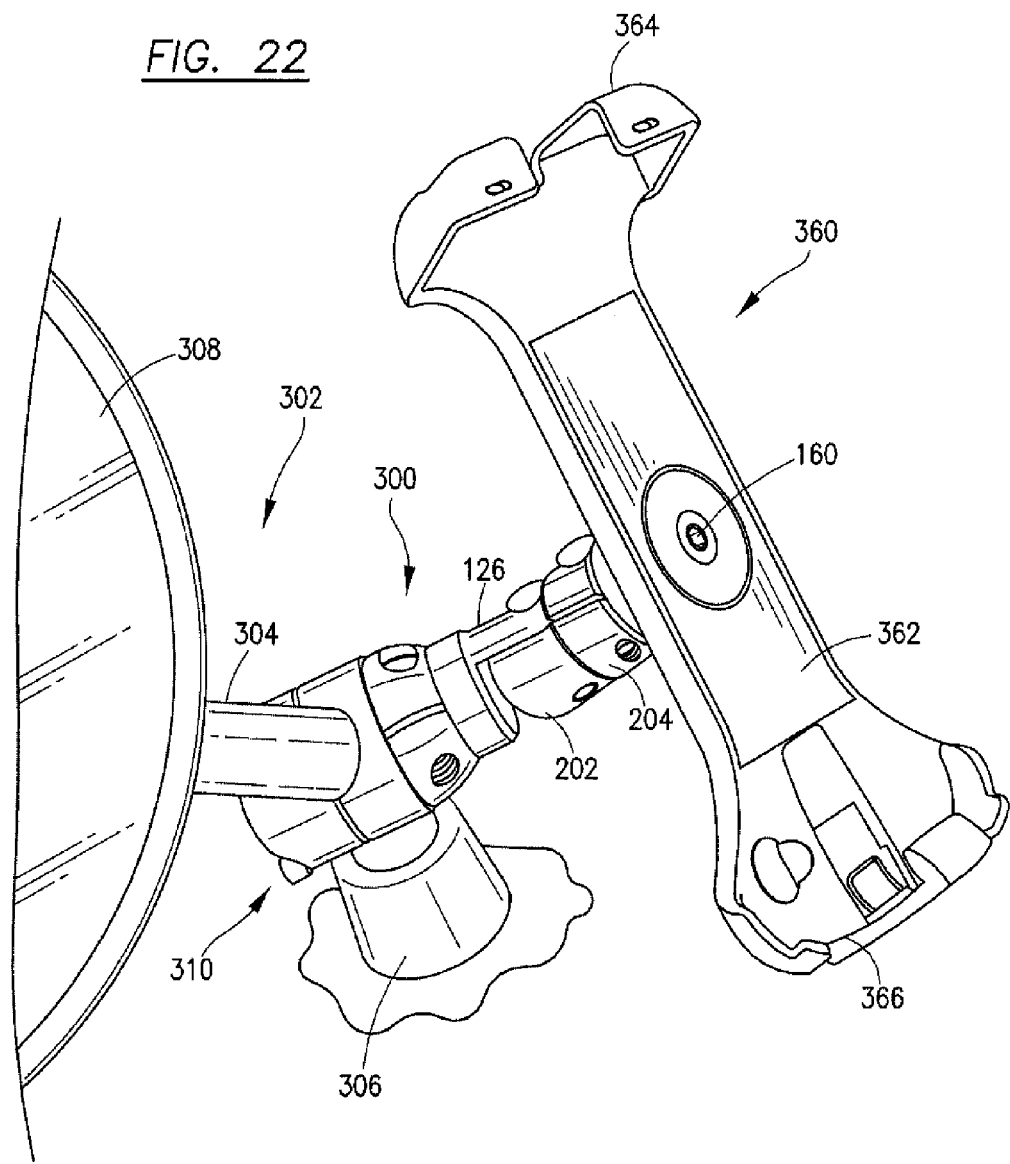

SCOOTER DEVICE MOUNTING ASSEMBLY

CROSS REFERENCE TO RELATED APPLICATIONS

This application is a continuation-in-part of and claims priority under 35 U.S.C. §120 to co-pending U.S. application Ser. No. 13/351,260 filed Jan. 17, 2012 which is a continuation-in-part of U.S. application Ser. No. 12/711,767 filed Feb. 24, 2010, now U.S. Pat. No. 8,261,954 issued Sep. 11, 2012. U.S. application Ser. Nos. 12/711,767 and 13/351,260 are expressly incorporated herein by reference in their entirety to form a part of the present disclosure.

FIELD OF THE INVENTION

This invention relates to mounts for securing portable devices to vehicles, and, more particularly, to a device mounting assembly for a scooter that resists relative rotational movement at the connection between the assembly and the scooter and at the connection between the assembly and the portable device while permitting disengagement at one or both of such connections in response to the application of a sufficient force to the mount.

BACKGROUND OF THE INVENTION

High fuel prices and traffic congestion have made motorcycles, and motorized scooters such as those commercially available from Piaggio & Co. S.p.A. under the trademark "Vespa®", an increasingly common mode of transportation, not only for recreational purposes but for people commuting to and from their place of employment. While production vehicles of this type may include some amenities found in automobiles and other vehicles, such as a radio, they have no means of providing riders with ready access to items such as radar detectors, toll road transponders, global positioning devices (GPS), cellular telephones, cameras, change holders, garage door openers, personal digital assistants (PDA) and other portable devices.

This deficiency of production motorcycles and scooters has been addressed by aftermarket mounting devices that may be secured to different parts of the vehicle. These include handlebar mounts, control mounts, stem mounts, fairing mounts, mirror mounts and different specialty mounts. In each case, the mount generally comprises a vehicle mounting element designed to attach to a part of the vehicle, a lower pivot coupled to the vehicle mounting element, a device mounting plate designed to support a number of different portable devices, an upper pivot coupled to the device mounting plate, and, a shaft extending between the upper and lower pivots. The mount is connected to the vehicle and a portable device such as a GPS is secured to the device mounting plate, at which time the position of the GPS may be adjusted by manipulation of one or both of the upper and lower pivots to the satisfaction of the rider. This arrangement allows the cyclist ready access to and/or viewing of a given portable device, and reduces potentially dangerous situations wherein the rider must reach into a pocket of his or her clothing, or a storage area of the vehicle, to access a particular device while riding.

Most vehicle mount designs employ a threaded connection between the vehicle mounting element and lower pivot, and between the device mounting plate and upper pivot, in order to secure them in a fixed position. Typically, a bolt or other threaded fastener is extended between such elements and tightened down to maintain the portable device in position during use. This arrangement is less than desirable in several respects. Because vehicle mounts of this type are aftermarket items, they are usually installed by the owner of the vehicle. Although installation is not difficult, it can be done improperly such as by failing to adequately tighten the bolts or other fasteners. Further, threaded connections between the vehicle mounting element and lower pivot, and/or between the device mounting plate and upper pivot, can loosen over time given the vibration and jarring of the vehicle that takes place when riding. In either case, if such connections become loose the vehicle mount can pivot to an undesirable position and distract the rider potentially leading to injury.

Another potential problem with threaded connections of the type utilized in conventional aftermarket vehicle mounts involves the performance of the mount in the event of an accident. It has been found that the application of a sufficient force to a vehicle mount, such as resulting from an impact during an accident, can cause the portable device secured to the device mounting plate or the entire mount itself to literally fly off of the location where it is mounted to the motorcycle. A heavier item such as a GPS can effectively become a missile under these circumstances and cause injury to the rider or to others in the vicinity of the accident.

SUMMARY OF THE INVENTION

This invention is directed to a device mounting assembly particularly intended for connection to the mirror mount of a motorized scooter so that a portable device such as GPS device, cellular telephone, camera and the like may be positioned for ready access by the rider of the scooter. Preferably, a severable pin connection is provided at the location where the assembly is coupled to the vehicle and/or where the assembly is coupled to a portable device. These pin connections help resist relative movement at such locations under normal operating conditions of the vehicle, but may be severed in response to the application of a sufficient force to the assembly, such as during an accident, to resist disengagement of the portable device from the vehicle.

In one presently preferred embodiment, the device mounting assembly of this invention comprises a vehicle mounting element having an anti-rotation pin that seats within a selected one of a number of cavities formed in the facing surface of a lower coupler to which it is connected. The assembly also includes a device mounting plate formed with an anti-rotation pin that seats within one of a number of cavities in the facing surface of an upper coupler. Alternatively, the positioning of the anti-rotation pins and cavities may be reversed, i.e. the anti-rotation pins may be formed in the upper and lower couplers while the vehicle mounting element and device mounting plate have cavities or through bores to receive such pins. It is contemplated that the upper and lower couplers may be connected together by a shaft, or they may be directly connected to one another in which case one of the upper and lower couplers is formed with at least one cavity and the other an anti-rotation pin.

In one embodiment, a threaded connection is provided between the vehicle mounting element and lower coupler, and between the device mounting plate and upper coupler. Alternatively, the lower coupler may be mounted to the vehicle mounting element by clamping an extension formed in the lower coupler between two clamping sections of the vehicle mounting element. Further, the two couplers may be connected to one another by a threaded fastener. In the particular embodiment of this invention directed to a device mounting assembly for a motorized scooter, the vehicle mounting element comprises first and second clamping elements each having a hollow interior and recesses in end portions thereof which connect together and clamp to the support rod of the scooter mirror mount. One of the first and second clamping elements is formed with a slot defining a first clamping section and a mating second clamping section which are configured to receive and clamp the extension of the lower coupler noted above.

In a further embodiment of this invention, a second joint connection comprising an extension and two clamping sections is provided between the device mounting plate and the upper coupler. As discussed below, this joint connection may be loosened to allow for rotation of the device mounting plate relative to the remainder of the vehicle mount without disconnecting the device mounting plate from the upper coupler. The position of the device carried by the device mounting plate is thus easily adjusted, as desired. In all of the embodiments, additional resistance to relative rotation of the mount components is provided by connection of the anti-rotation pins within selected cavities. Even if a bolt or other threaded fastener that connects the vehicle mount elements together should loosen to some extent, unwanted rotation of such elements relative to one another is substantially prevented by the anti-rotation pins.

An important feature of this invention involves its performance in response to the application of a severe force, such as might occur during an accident. In the presently preferred embodiment, the anti-rotation pins are formed of a first material and the structure formed with cavities or through holes is made of a second material. One of the first and second materials has a hardness greater than the other. Consequently, in response to the application of a sufficient force to the vehicle mount, shearing occurs at the interface between the anti-rotation pins and the cavity or hole in which they are seated such that the anti-rotation pin either breaks off or it breaks through the material of the element in which the cavity or hole is formed. This permits relative rotation between the upper coupler and the device mounting plate, and/or between the lower coupler and the vehicle mounting element, and/or between the two couplers, which helps to prevent the portable device supported by the device mounting assembly, or the assembly itself, from being dislodged from the vehicle. The assembly essentially "gives way" without coming apart, so that the brunt of the force from the accident or the like causes rotation of the assembly components rather than separating them from the vehicle.

BRIEF DESCRIPTION OF THE DRAWINGS

The structure, operation and advantages of the presently preferred embodiment of this invention will become further apparent upon consideration of the following description, taken in conjunction with the accompanying drawings, wherein:

FIG. 2 is a disassembled, bottom perspective view of the device mounting plate and upper pivot of the mount shown in FIG. 1;

FIG. 3 is a disassembled, perspective view of the vehicle mounting element and lower pivot of the mount depicted in FIG. 1;

FIG. 4 is a plan view of the device mounting plate and upper pivot illustrated in FIG. 2;

FIG. 5 is an assembled view of the device mounting plate and upper pivot shown in FIG. 4, with such components in a first position;

FIG. 6 is a view similar to FIG. 5 except with such components in a second position;

FIG. 9 is a perspective view of a stem mount according to this invention;

FIG. 10 is a view similar to FIG. 3 except depicting an anti-rotation pin mounted to the couple and cavities formed in the vehicle mounting element;

FIG. 16 is a disassembled, perspective view of the upper and lower couplers depicted in FIG. 15;

FIG. 17 is a disassembled, perspective view of the upper and lower connection between the spacer and the device mounting plate of the mount shown in FIG. 15;

FIG. 20 is a disassembled, perspective view of the vehicle mount of the embodiment depicted in FIG. 19 shown partially in phantom lines;

FIG. 21 is a cross sectional view of the vehicle mount of FIG. 19;

FIG. 22 is a perspective view of the device mounting assembly of FIG. 19 connected to the mirror mount for a motorized scooter and having coupling structure in the form of a cradle for mounting a cellular telephone;

DETAILED DESCRIPTION OF THE INVENTION

Figure 1:
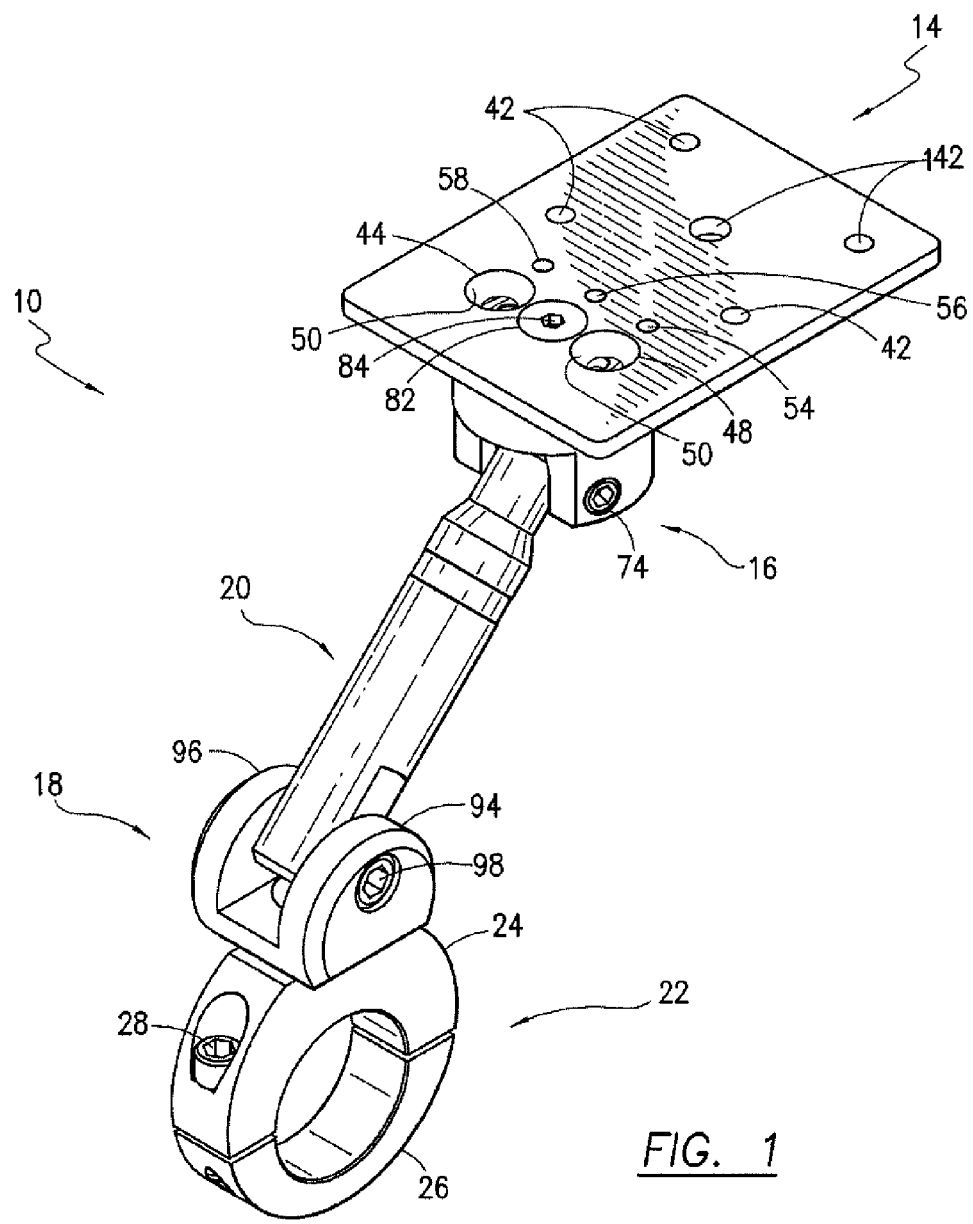
FIG. 1 is perspective view of a handlebar mount according to this invention.
Figure 8:
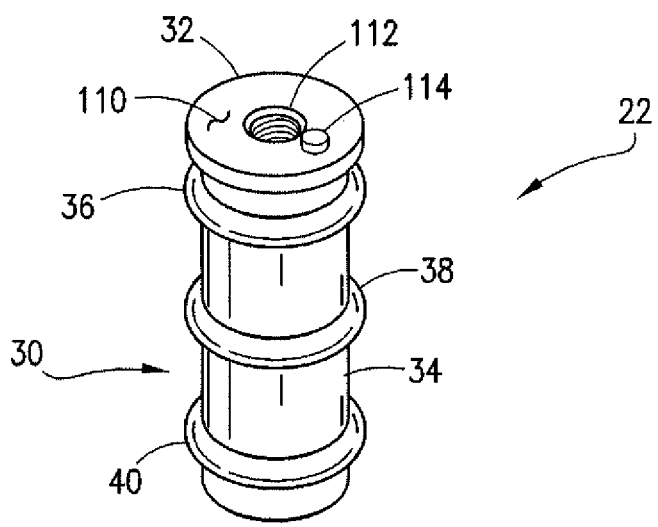
FIG. 8 is a perspective view of a vehicle mounting element for the stem mount illustrated in FIG. 9.

Referring initially to FIGS. 1, 8 and 9, two types of vehicle mounts according to this invention are shown. As discussed above, mounts for supporting portable items such as radar detectors, toll road transponders, GPS devices, cellular telephones, cameras, change holders, garage door openers, PDAs, radios and other devices have been designed for attachment to different locations on motorcycles and other vehicles. For purposes of illustration, a handlebar mount 10 is depicted in FIG. 1 and a stem mount 12 is shown in FIG. 9. It should be understood that the following discussion applies to any type of vehicle mount for motorcycles and other vehicles, and is not intended to be limited to the mounts 10 and 12.

Each of the mounts 10 and 12 comprises a device mounting plate 14, an upper coupler 16, a lower coupler 18, a shaft 20 connected between the upper and lower couplers 16, 18, and, a vehicle mounting element 22. The term "vehicle mounting element" as used herein is meant to broadly refer to any structure that secures the mount 10 or 12 to the motorcycle or other vehicle. In the case of the handlebar mount 10 shown in FIG. 1, the vehicle mounting element 22 comprises an upper clamp section 24 and a lower clamp section 26 which extend around the handlebar of a motorcycle (not shown) and are connected to one another by one or more bolts 28. The vehicle mounting element 22 of the stem mount 12 comprises a rod 30 having a radially outwardly extending upper end 32 and an outer surface 34 that mounts three o-rings 36, 38 and 40. Additional structure of the vehicle mounting elements 22 is described below. For purposes of the present discussion, the terms "upper," "lower," "top" and "bottom" refer to the orientation of the mounts 10 and 12 as depicted in FIGS. 1 and 9.

With reference to FIGS. 1-3, the handlebar mount 10 is described in more detail. The device mounting plate 14 is generally rectangular-shaped formed with a number of device bores 42 arranged in a pattern that permits coupling to a number of different portable devices of the type noted above. Such devices may include mounting structure such as threaded studs (not shown) extending from the bottom of the device through one or more of the device bores 42 to receive nuts (not shown) for mounting the device onto the plate 14. Three through bores 44, 46 and 48 are formed near one end of the plate 14, as shown, and have a chamfer 50 at the top surface 52 of the plate 14. As best seen in FIG. 2, three anti-rotation pins 54, 56 and 58 are connected to the bottom surface 60 of the plate 14 and extend outwardly therefrom. The pins 54-58 generally align with respective through bores 44-48. The pins 54-58 may be formed of a material having a hardness greater or less than that of the upper coupler 16, for purposes to become apparent below.

The upper coupler 16 comprises a body portion 62 having an upper planar surface 64, an outer surface 66 and a beveled surface 68 extending between the planar surface 64 and outer surface 66. Two spaced arms 70 and 72 extend downwardly from the body portion 62 to receive the upper end of shaft 20 which is coupled thereto by a bolt 74. A number of blind holes 78, each defining a cavity, are formed in the body portion 62. The blind holes 78 are circumferentially spaced from one another and radially spaced from an internally threaded bore 80 located at the center of the upper planar surface 64. The blind holes 78 and threaded bore 80 extend from the upper planar surface 64 of the body portion 62 in a downward direction toward the arms 70, 72.

The device mounting plate 14 and upper coupler 16 are connected to one another by a bolt 82 preferably having a head with a countersunk recess 84 shaped to fit an Allen wrench (not shown). As best seen in FIGS. 2 and 4-7, the device mounting plate 14 and upper coupler 16 are oriented relative to one another such that the planar surface 64 of the upper coupler 16 rests against the bottom surface 60 of the device mounting plate 14, with the internally threaded bore 80 in the upper pivot placed in alignment with one of the through bores 44, 46 or 48 of the device mounting plate 14 and one of the anti-rotation pins 54, 56 or 58 seated within one of the blind holes 78. The bolt 82 is inserted through whichever through bore 44, 46 or 48 is placed in alignment with the internally threaded bore 80 in the upper coupler 16, and then tightened down. The head of the bolt 82 is tapered to fit within the chamfer 50 of the through bores 44-48 so that it is flush with the upper surface 52 of the device mounting plate 14.

The purpose of providing multiple through bores 46-48 in the device mounting plate 14 is to permit variation of its position relative to the upper coupler 16 and the rest of the mount 10 or 12. Depending upon the configuration of a particular motorcycle or other vehicle, and/or the preferences of the rider, it may be necessary to shift the position of the device mounting plate 14 to avoid an obstruction or to place an item carried on the mount 10 in a more convenient location for the rider. Any one of the through bores 44, 46 or 48 may be aligned with the internally threaded bore 80 of the upper coupler 16, such as the middle bore 46 as shown in FIG. 5 or the bore 48 as depicted in FIG. 6.

Figure 7:
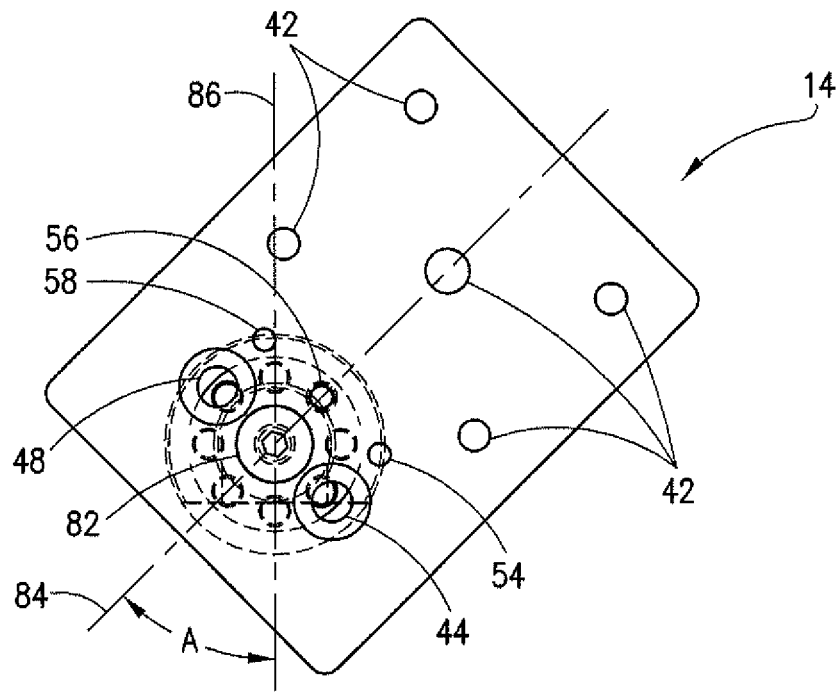
FIG. 7 is a view similar to FIG. 5 with the device mounting plate rotated in a clockwise direction.

In addition to side-to-side adjustment of the position of the device mounting plate 14 relative to the upper coupler 16, as illustrated in FIGS. 5 and 6, the device mounting plate 14 may be oriented at an angle with respect to the upper coupler 16 as shown in FIG. 7. The term "angle" in this context refers to the relationship between the longitudinal axis 84 of the device mounting plate 14 and an axis 86 that bisects the internally threaded bore 80 of the upper coupler 16 in between the two arms 70 and 72. As viewed in FIG. 5, the axes 84 and 86 are essentially coincident with one another. In FIG. 6, the device mounting plate 16 has been moved toward one side of the upper coupler 16, e.g. with the through bore 44 in alignment with the internally threaded bore 80, but no "angle" is formed between the axes 84 and 86 because they are substantially parallel to one another. In both FIGS. 5 and 6, the same blind hole 78 in the upper coupler 16 receives the middle anti-rotation pin 56 (FIG. 5) or the anti-rotation pin 54 (FIG. 6) located on the device mounting plate 14. The device mounting plate 14 may be turned or oriented at an angle relative to the upper coupler 16 by aligning one of the anti-rotation pins 54-58 with a different blind hole 78 such that the axes 84 and 86 form an angle relative to one another. In FIG. 7, the middle anti-rotation pin 56 is illustrated as being located within a different blind hole 78 than the one in which it is seated in FIG. 5. In any case, the beveled surface 68 provides clearance between the upper coupler 16 and the anti-rotation pins 54, 56 or 58 regardless of which one of the pins 54-58 is seated within any one of the blind holes 78.

A generally similar mounting arrangement is provided between the lower coupler 18 and the vehicle mounting element 22. Referring to the embodiment illustrated in FIGS. 1 and 3, the lower coupler 18 comprises a body portion 88 having a planar surface 90 and a beveled surface 92. Two spaced arms 94 and 96 extend downwardly from the body portion 88 to receive the lower end of shaft 20 which is coupled thereto by a bolt 98. A number of blind holes 100, each defining a cavity, are formed in the body portion 88. The blind holes 100 are circumferentially spaced from one another and radially spaced from a through bore 102 that passes through the body portion 88 at the center of the planar surface 90. The blind holes 100 extend from the planar surface 90 of the body portion 88 in a direction toward the arms 94, 96.

As noted above, the vehicle mounting element 22 of the handlebar mount 10 depicted in FIG. 1 includes upper and lower clamp sections 24 and 26. Referring to the embodiment shown in FIG. 3, the upper clamp section 24 is formed with a planar surface 104 that rests against the planar surface 90 of the lower coupler 18 when the vehicle mounting element 22 and lower coupler 18 are assembled. An internally threaded bore 106 is centered in the upper clamp section 24, extending from its planar surface 104 toward the lower clamp section 26, and an anti-rotation pin 108 extends outwardly from the planar surface 104 of upper clamp section 24 in a position radially spaced from the internally threaded bore 106. When assembled, the through bore 102 in the lower coupler 18 aligns with the internally threaded bore 106 in the upper clamp section 24 and the anti-rotation pin 108 of the upper clamp section 24 seats within one of the blind holes 100 in the lower coupler 18. Depending upon which blind hole 100 receives the anti-rotation pin 108, the lower coupler 18 can be positioned at different angles relative to the vehicle mounting element 22.

An alternative embodiment of the lower coupler 18 and vehicle mounting element 22 is illustrated in FIG. 10. The structure of lower coupler 18 and vehicle mounting element 22 is the same as that shown in FIG. 3, except the position of the anti-rotation pin 108 and blind holes 100 is reversed. Specifically, in FIG. 10 an anti-rotation pin 109 is mounted on the planar surface 90 of the lower coupler 18 and a number of blind holes 101 are formed in the planar surface 104 of the upper clamp section 24 of the vehicle mounting element 22. The blind holes 101 are circumferentially spaced from one another and radially spaced from the threaded bore 106 at the center of upper clamp section 24 of vehicle mounting element 22. As seen in FIG. 10, the planar surface 104 of the upper clamp section 24 is wider than that of the embodiment depicted in FIGS. 1 and 3 in order to provide space for the blind holes 101. When assembled, the anti-rotation pin 109 of the lower coupler 18 is received within one of the blind holes 101 in the vehicle mounting element 22.

The same lower coupler 18 shown in FIGS. 1 and 3 is employed in the stem mount 12 illustrated in FIG. 9, but, as noted above, the vehicle mounting element 22 has a different construction than in the embodiment of FIG. 1. In the presently preferred embodiment, as best seen in FIG. 8, the upper end 32 of the rod 30 forming the vehicle mounting element 22 is formed with a planar surface 110 which rests against the planar surface 90 of the lower coupler 18 when assembled. An internally threaded bore 112 is formed in the rod 30, centered on its planar surface 110, and an anti-rotation pin 114 extends outwardly from the planar surface 110 of the rod 30 in a position radially spaced from the internally threaded bore 112. When assembled, the through bore 102 in the lower coupler 18 aligns with the internally threaded bore 112 in the rod 30 and the anti-rotation pin 114 of the rod 30 seats within one of the blind holes 100 in the lower coupler 18. A bolt 116 is inserted through the through bore 102 in the lower coupler 18 and into the internally threaded bore 112 of the rod 30 to connect the lower coupler 18 to the vehicle mounting element 22. Depending upon which blind hole 100 receives the anti-rotation pin 114, the lower coupler 18 can be positioned at different angles relative to the vehicle mounting element 22. It should be understood that the location of anti-rotation pin 114 and blind holes 100 may be reversed in the lower coupler 18 employed with stem mount 12, as in the embodiment shown in FIG. 10. In particular, the anti-rotation pin 114 may be formed on the planar surface 90 or lower coupler 18 and the planar surface 110 of the vehicle mounting element 22 may be formed with blind holes 100.

Referring now to FIGS. 11-14, an alternative embodiment of the vehicle mount 120 of this invention is illustrated. The vehicle mount 120 includes a device mounting plate 122, an upper coupler 124, a lower coupler 126 and a vehicle mounting element 128. The device mounting plate 122 is shown as circular in FIG. 11, but it could be square, rectangular or another shape, as desired. The device mounting plate 122 is formed with a number of device bores 130, and three through bores 132, 134 and 136 each having a chamfer 138. In the presently preferred embodiment, a number of through holes 140 are formed in the device mounting plate 122 which are circumferentially spaced from one another and radially spaced from the center through bore 134.

The upper coupler 124 has a generally L-shaped body portion 142 formed with a base section 144 and a leg section 146 oriented perpendicularly to one another. The base section 144 has a planar surface 148 formed with a central, internally threaded bore 150 and an anti-rotation pin 152 which is spaced from the bore 150. The leg section 146 is formed with an internally threaded bore 154, and an anti-rotation pin 156 extends outwardly from the surface 158 of leg section 146. The device mounting plate 122 and upper coupler 124 are connected to one another by a bolt 160 which may be inserted into any one of the through bores 132-136 and then threaded into the threaded bore 150 in the upper coupler 124. The anti-rotation pin 152 seats within one of the through holes 140 in the device mounting plate 122. The positioning of the upper coupler 124 relative to the three through bores 132-136, and rotation of the device mounting plate 122 relative to the upper coupler 124, is the same as that described above in connection with a discussion of the embodiment of FIGS. 1-7.

Figure 11:
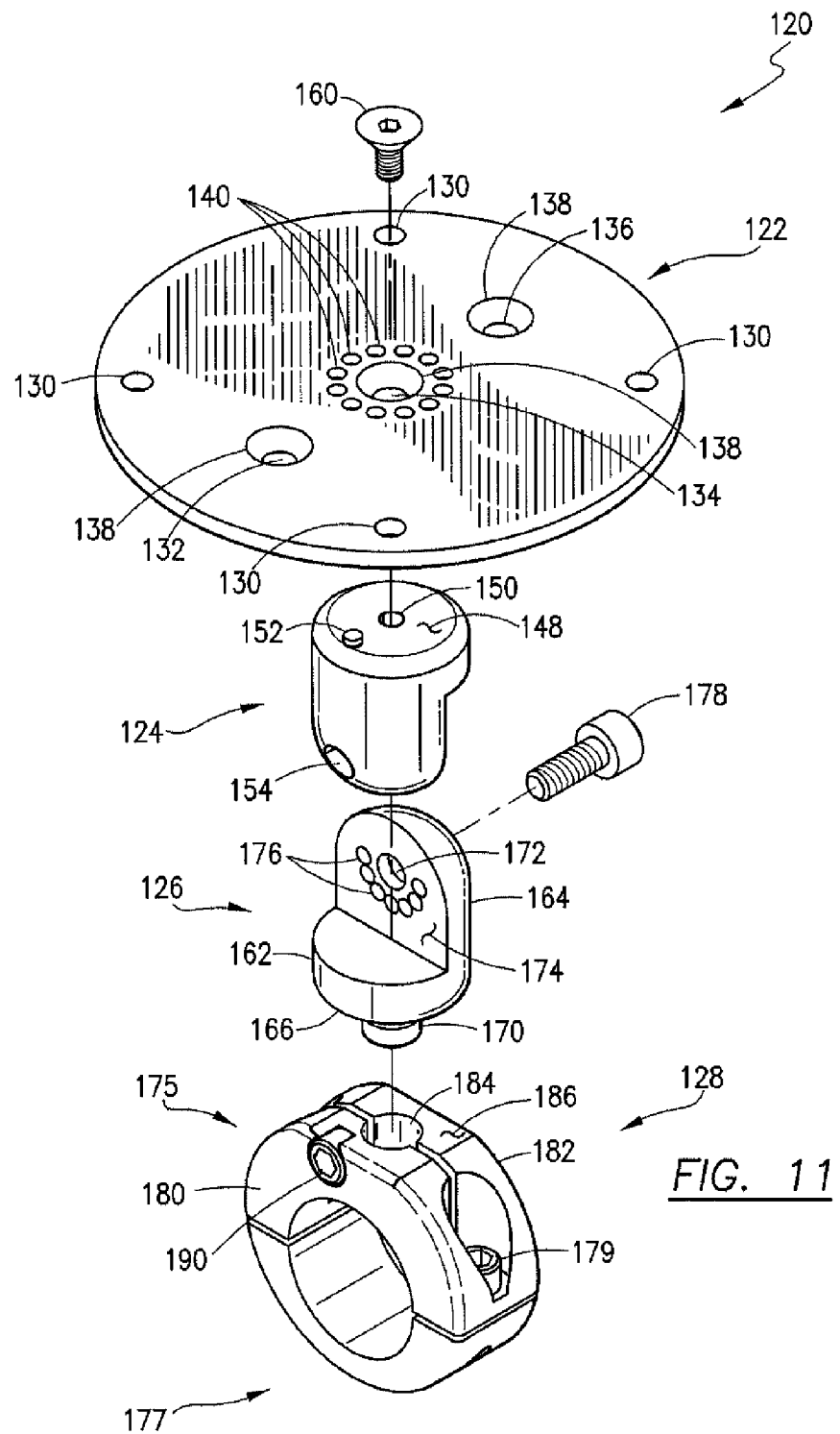
FIG. 11 is an exploded, perspective view of an alternative embodiment of the vehicle mount of this invention.
Figure 12:
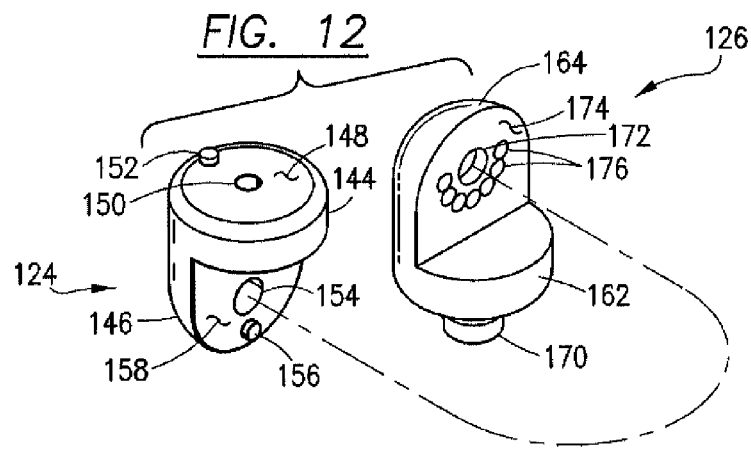
FIG. 12 is a disassembled, perspective view of the couplers depicted in FIG. 11.

As best seen in FIG. 11, the mount 120 differs from mounts 10 and 12 in that the shaft 20 is eliminated and the upper and lower couplers 124, 126 are directly connected to one another. In the presently preferred embodiment, the lower coupler 126 has a generally L-shaped body portion formed with a base section 162 and a leg section 164 oriented perpendicularly to one another. The base section 162 is formed with a bottom surface 166 which mounts an extension 168 having a circumferential recess 170. The leg section 164 of lower coupler 126 has a through bore 172 and a planar surface 174 formed with a number of inwardly extending blind holes 176.

The upper and lower couplers 124, 126 are connected to one another by placing their respective leg sections 146 and 164 together such that the threaded bore 150 in the upper coupler 124 aligns with the through bore 172 in the lower coupler 126 and the anti-rotation pin 156 of the upper coupler 124 extends into one of the blind holes 174 in the lower coupler 126. A bolt 178 is inserted through the bore 172 in the lower coupler 126 and then into the threaded bore 154 in the upper coupler 124 where it is tightened down.

Figure 14:
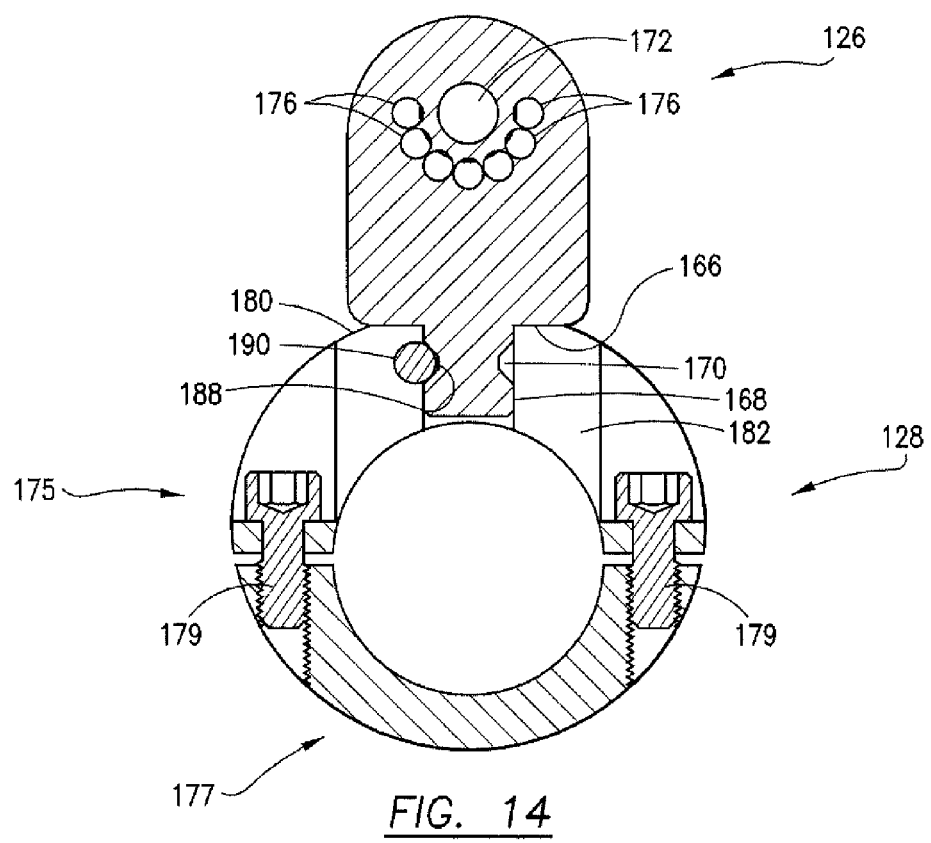
FIG. 14 is a cross sectional, assembled view of the lower coupler and vehicle mounting element illustrated in FIG. 11.

The vehicle mounting element 128 of the mount 120 includes an upper portion 175 connected to a lower portion 177 by bolts 179. In the presently preferred embodiment, the upper portion 175 of mount 120 is formed with a slot 181 defining a first clamping section 180 and a second clamping section 182 that may be partially separated from one another. Referring to FIGS. 11 and 14, a through bore 184 is formed in the upper portion 175 of mount 120, partially in the first clamping section 180 and partially in the second clamping section 182, which, when the first and second clamping sections 180, 182 are moved apart, receives the extension 168 of the lower coupler 126. The bottom surface 166 of the lower coupler 126 rests atop a planar surface 186, collectively formed by the first and second clamping sections 180, 182, with the extension 168 seated in the through bore 184. A cross bore 188 is formed in the upper portion 175 of the vehicle mounting element 128, comprising an unthreaded portion in the first clamping section 180 and a threaded portion in the second clamping section 182. A bolt 190 is inserted through the unthreaded portion of cross bore 188 in first clamping section 180 and then into the threaded portion of cross bore 188 in the second clamping section 182. As seen in FIG. 14, the bolt 190 extends within the recess 170 formed in the extension 168 when positioned within the cross bore 188. The bolt 190 is tightened down to draw the first and second clamping sections 180, 182 toward one another to clamp the extension 168 between them in order to secure the lower coupler 126 within the vehicle mounting element 128. Additionally, the bolt 190 is captured within the recess 170 formed in the extension 168 of the lower coupler 126 when inserted into the cross bore 188 to further secure the lower coupler 126 and vehicle mounting element 128 together. Since the recess 170 extends about the entire circumference of the extension 168, the lower coupler 126 may be rotated to any position relative to the vehicle mounting element, or vice versa, while retaining alignment between the cross bore 188 and recess 170.

Referring now to FIGS. 15-18, a still further embodiment of a mount 200 according to this invention is illustrated. Mount 200 is similar in some respects to the mount 120 depicted in FIGS. 11-14 and the same reference numbers are used in FIGS. 15-18 to denote common structure.

Figure 15:
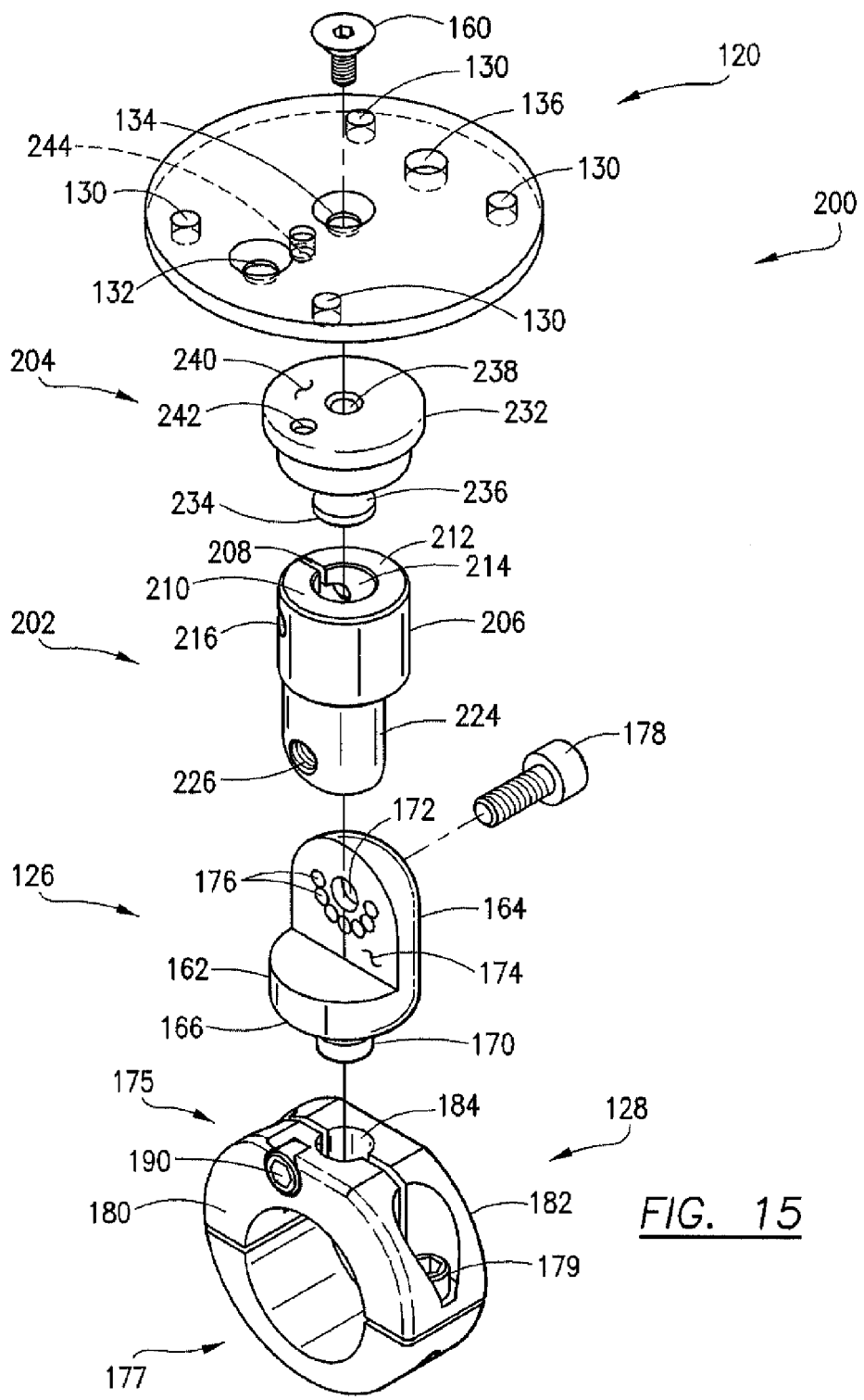
FIG. 15 is an exploded, perspective view of a still further embodiment of the vehicle mount of this invention.
Figure 18:
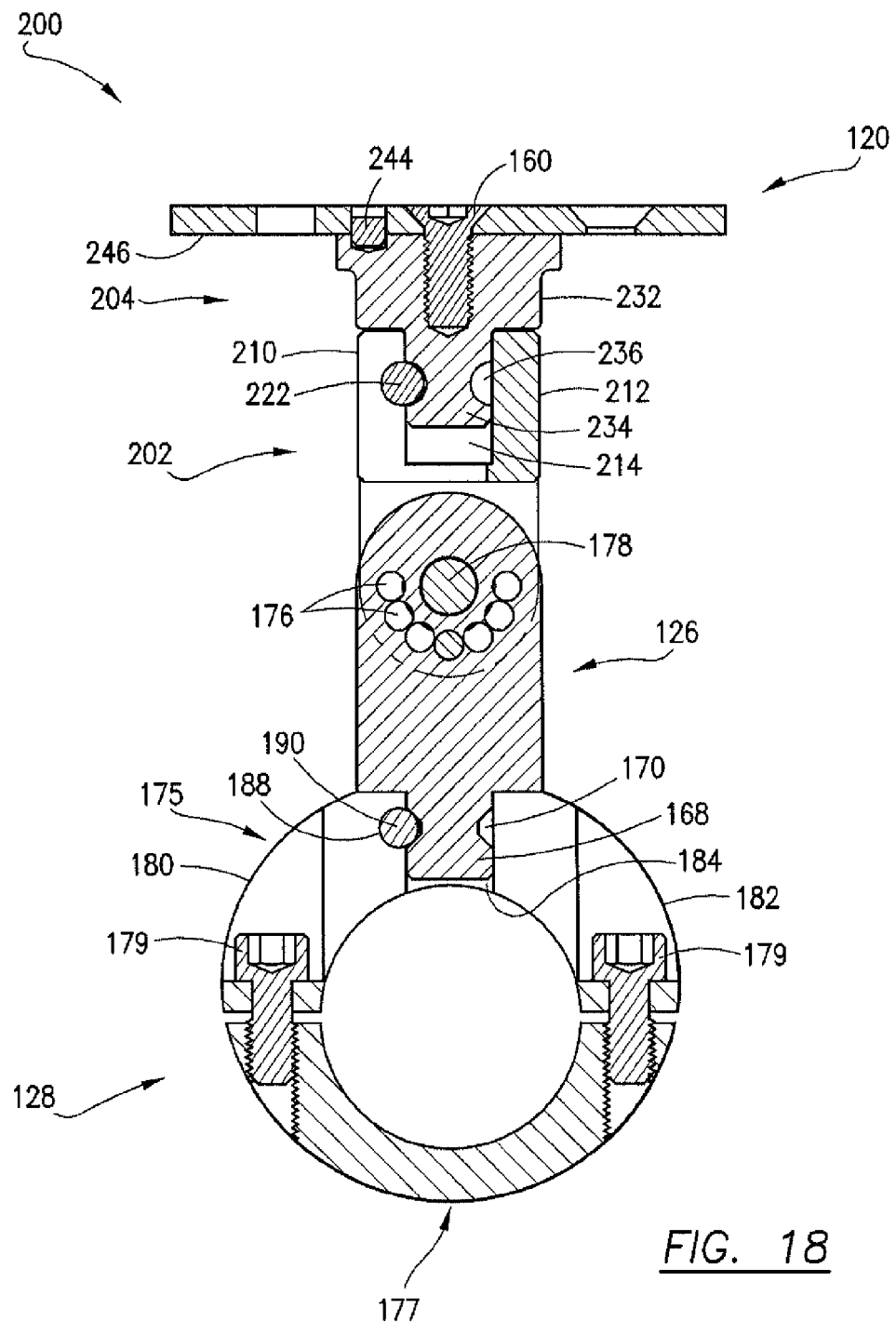
FIG. 18 is a cross sectional, assembled view of the mount illustrated in FIG. 15.

As viewed in FIGS. 11 and 15, the vehicle mounting element 128 and lower coupler 126 are the same in both embodiments. The mount 200, however, includes a different upper coupler 202, a modified device mounting plate 120 and the addition of a spacer 204. The upper coupler 202 has a body portion 206 formed with a slot 208 extending along one side thereof defining a first clamping section 210 and a second clamping section 212. A bore 214 extends into the body portion 206 of the upper coupler 202 and is partially formed in both the first and second clamping sections 210, 212. The body portion 206 is also formed with a cross bore 216 which intersects the bore 214 and is generally perpendicular thereto. The cross bore 216 includes an unthreaded portion formed in the first clamping section 210 and a threaded portion formed in the second clamping section 212 which align with one another in order to receive a threaded fastener such as a bolt 222.

The body portion 206 of upper coupler 202 is joined to a leg section 224 having an internally threaded bore 226, a surface 228 and an anti-rotation pin 230 extending outwardly from the surface 228. As seen in FIG. 16, the upper coupler 202 is connected to the lower couplers 126 by placing their respective leg sections 224 and 164 together such that the threaded bore 226 in the upper coupler 202 aligns with the through bore 172 in the lower coupler 126 and the anti-rotation pin 230 of the upper coupler 202 extends into one of the blind holes 174 in the lower coupler 126. A bolt 178 is inserted through the bore 172 in the lower coupler 126 and then into the threaded bore 226 in the upper coupler 202 where it is tightened down.

Figure 13:
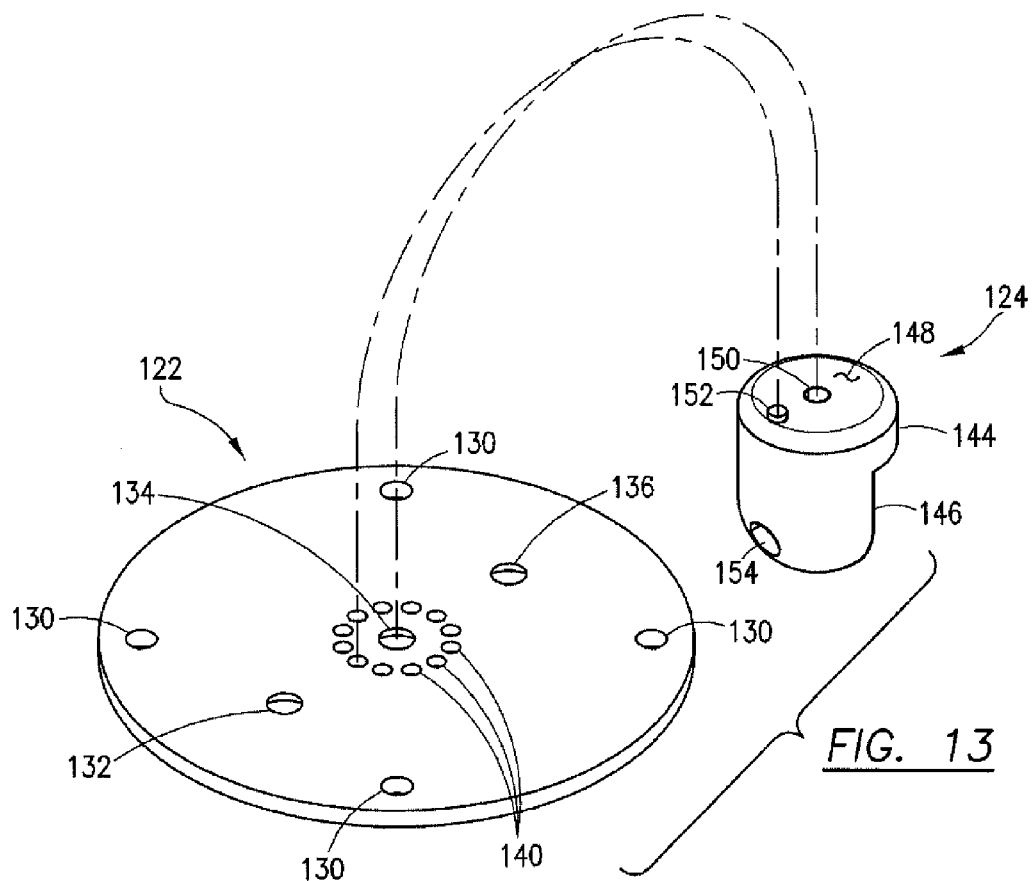
FIG. 13 is a disassembled, perspective view of the connection between the upper coupler and mounting plate of the mount shown in FIG. 11.

The spacer 204 comprises a body portion 232 formed with an extension 234 having a circumferentially extending recess 236. An internally threaded bore 238 extends inwardly from the surface 240 of the body portion 232, and a cavity 242 is radially spaced from the bore 238. The device mounting plate 122 depicted in FIGS. 11 and 13 is modified in the mount 200 of the embodiment of FIGS. 14-18 by eliminating the through holes 140 and replacing them with a single anti-rotation pin 244 which extends outwardly from the bottom surface 246 of device mounting plate 122. In order to connect the spacer 204 to the device mounting plate 122, the anti-rotation pin 244 is inserted into the cavity 242 and then a bolt 160 is extended through the center through bore 134 in the device mounting plate 122 into the internally threaded bore 238 in the spacer 204 where it is tightened down. The spacer 204, in turn, is connected to the upper coupler 202 by inserting the extension 234 of the spacer 204 into the bore 214 formed in the body portion 206 of the upper coupler 202. The first and second clamping sections 210, 212 in the upper coupler 202 are then urged toward one another by tightening the bolt 222 within the cross bore 216 thus securing the extension 234 of the spacer 204 between them.

One advantage of the mount 200 illustrated in FIGS. 15-18 is that adjustment of the position of a device relative to a vehicle (not shown) is made easier by the joint connections between the lower coupler 126 and device mounting element 128, and between the device mounting plate 122 and upper coupler 202 via the spacer 204. The bolt 190 which urges the first and second clamping sections 180, 182 of the device mounting element 128 toward one another may be loosened within cross bore 188 so that the extension 168 of the lower coupler 126 may be rotated within the bore 184 of the device mounting element 128 to any desired position. Similarly, the bolt 222 which connects the spacer 204 and upper coupler 202 may be loosened to permit rotation of the spacer 204 and device mounting plate 122 relative to the upper coupler 202. Unlike the embodiment of the mount 120 shown in FIGS. 11-14, there is no need to disassemble the spacer 204 or upper coupler 202 from the device mounting plate 122 in order to rotate it from one position to another. Instead, a device carried on the device mounting plate 122 may be positioned, as desired, with a quick loosening and then tightening of the bolt 222.

Referring now to FIGS. 19-26, a still further embodiment of this invention is illustrated. A device mounting assembly 300 according to this embodiment is particularly intended for mounting portable items to the mirror mount 302 of a motorized scooter (not shown). As schematically shown in FIG. 22, the mirror mount 302 includes a support rod 304 connected at one end to a base 306 carried by the scooter, and at the other end to a mirror 308.

Figure 19:
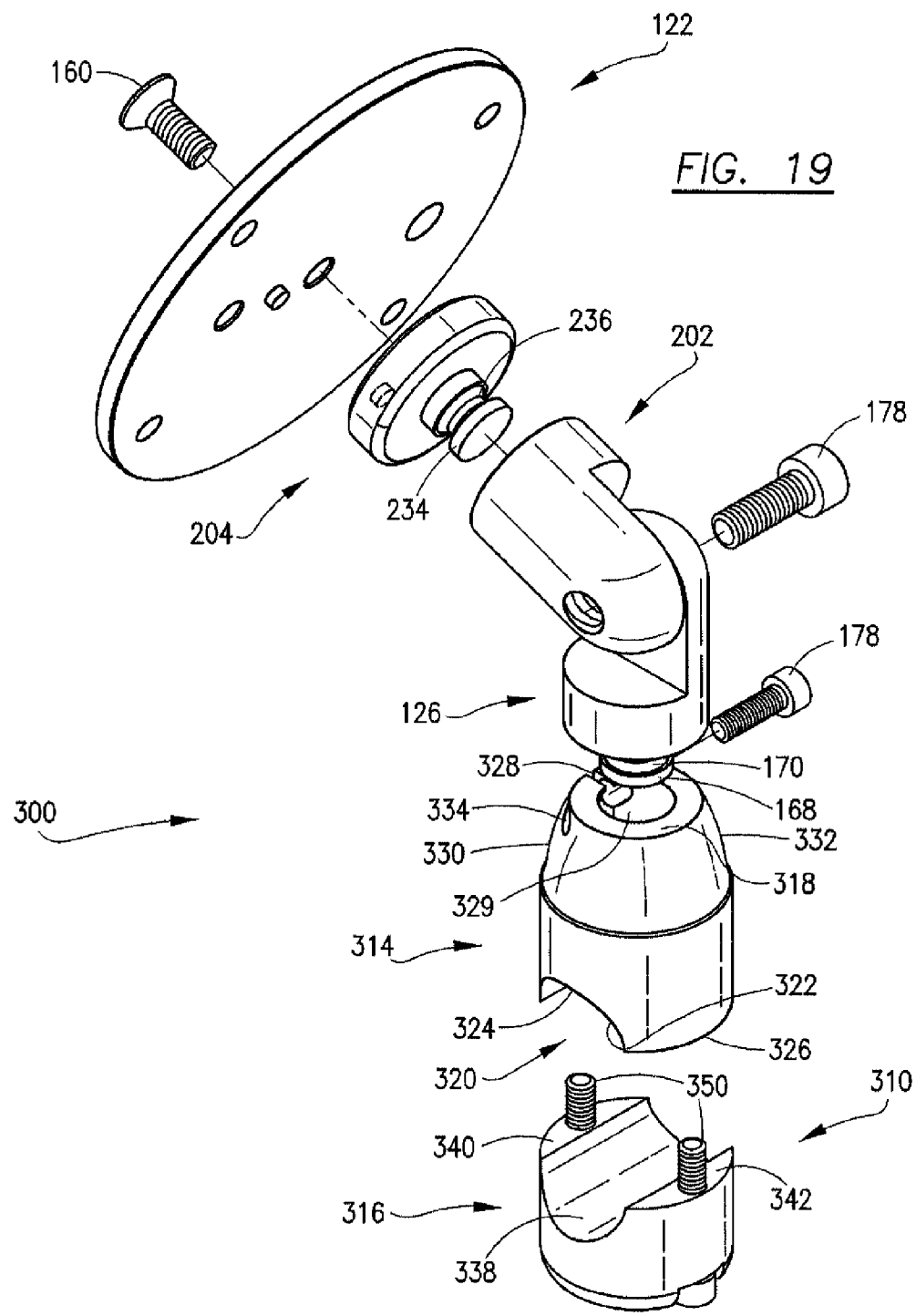
FIG. 19 is an exploded, perspective view of a further embodiment of a device mounting assembly according to this invention.

The device mounting assembly 300 generally comprises a vehicle mount 310 connected by coupling structure to a device mounting plate 122 or to other means for mounting portable devices as described below in connection with a discussion of FIGS. 22-26. In the embodiment of the device mounting assembly 300 shown in FIGS. 19-22, the coupling structure and device mounting plate 122 may be the same as that described above in connection with a discussion of FIGS. 15-18, and therefore the same reference numbers are used to denote like structure. As noted above, the coupling structure comprises a spacer 204, an upper coupler 202 and a lower coupler 126. The lower coupler 126 has an extension 168 formed with a circumferential recess 170 which is connected by a bolt 178 to the upper coupler 202. The upper coupler 202, in turn, is mounted to the spacer 204 via an extension 234 formed with a circumferential recess 236. The spacer 204 may be mounted by a bolt or screw 160 to the device mounting plate 122 as shown in FIG. 19 or to the cradle 312 depicted in FIG. 22. It should be understood that the device mounting assembly 300 may also comprise the vehicle mount 310 in combination with the coupling structure illustrated in FIGS. 11-14, e.g. upper coupler 124 and lower coupler 126, plus the device mounting plate 122 or other means for mounting portable devices.

The vehicle mount 310 of this embodiment is designed to connect to the support rod 304 of the scooter mirror mount 302. The vehicle mount 310 comprises an upper clamping element 314 and a lower clamping element 316, it being understood that the terms "upper" and "lower" are used herein for purposes of discussion and refer to the orientation of such elements 314, 316 as depicted in the Figs. The upper clamping element 314 is formed with a top end 318 and a bottom end 320 having a cavity 322 in the shape of a half cylinder defining spaced bottom end edges 324 and 326. An internally threaded bore 327 is located at each bottom end edges 324, 326 and extends toward the top end 318 of the upper clamping element 314. A slot 328 is formed in the upper clamping element 314 defining a first clamping section 330 and a second clamping section 332 on opposite sides of the slot 328. A stepped through bore 329 is partially formed in each of the first and second clamping sections 330, 332 of the upper clamping element 314, and it extends between the top and bottom ends 318, 320 thereof. A cross bore 334 is formed in each of the first and second clamping sections 330, 332 in position to intersect the stepped through bore 329.

The lower clamping element 316 has a top end formed with a cavity 338 in the shape of a half cylinder defining spaced top end edges 340 and 342. A recessed bore 344 extends from a bottom end 346 of the lower clamping element 316 to the top end edge 340, and a second recessed bore 348 extends from the bottom end 346 to the top end edge 342. In order to connect the device mounting assembly 300 to the support rod 304 of mirror mount 302, the upper and lower clamping elements 314 and 316 are positioned so that their respective cavities 322 and 338 each encircle approximately half of the support rod 302 such that the bottom end edges 324 and 326 of the upper clamping element 314 engage respective top end edges 340 and 342 of the lower clamping element 316. A fastener 350 is inserted into each of the first and second recessed bores 344, 348 and then tightened down into one of the internally threaded bores 327 in the upper clamping element 314.

The coupling structure formed by the spacer 204, upper coupler 202 and lower coupler 126 is connected to the vehicle mount 310 by inserting the extension 168 of the lower coupler 126 into the stepped through bore 329 of the upper clamping element 314 of vehicle mount 310. At least a portion of the circumferentially extending recess 170 formed in the extension 168 aligns with the cross bore 334 in the upper clamping element 314 regardless of the orientation of the extension 168 within the stepped through bore 329, i.e. the lower coupler 126 may be rotated to any position relative to the upper clamping element 314 while the recess 170 in extension 168 remains aligned with the cross bore 334. A portion of the cross bore 334 is internally threaded, either within the first or second clamping section 330, 332, and a bolt 178 may be inserted within the cross bore 334 and tightened down to capture the extension 168 between the first and second clamping sections 330, 332. A portion of the bolt 178 extends into the circumferentially extending recess 170 of the extension 168 to further secure the lower coupler 126 to the vehicle mount 310.

Referring now to FIGS. 22-26, the coupling structure of the device mounting assembly 300 may be secured to a device mounting plate 122 or to other means for mounting a portable device in position for ready access by the rider of the motorized scooter. In the embodiment of FIG. 22, a cradle 360 for a cellular telephone (not shown) is illustrated having a base 362 and opposed end walls 364, 366. The base 362 is connected by a bolt or screw 160 to the spacer 204 of the coupling structure described above in connection with a discussion of 15-18.

Figure 23:
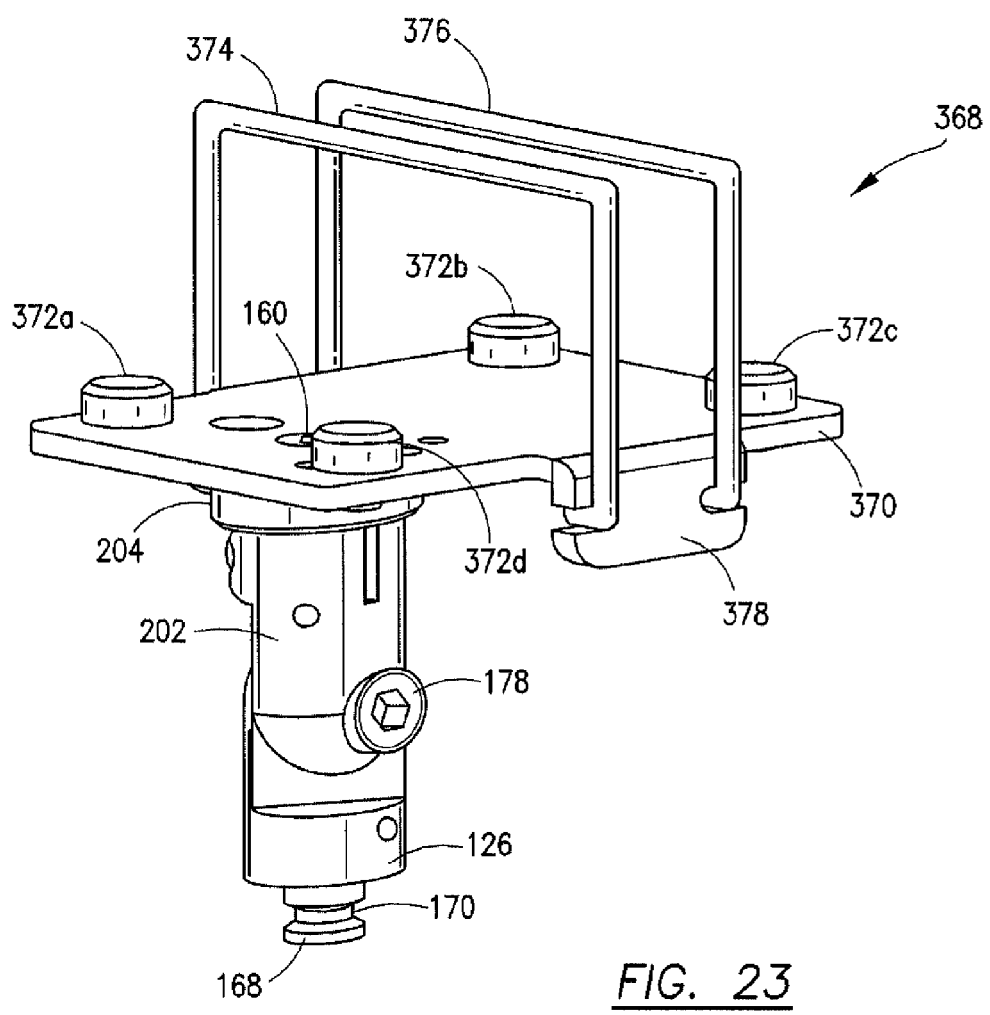
FIG. 23 is a perspective view of the device mounting assembly of this invention connected to a coupling structure in the form of a device support for mounting a radar detector.

FIG. 23 depicts a device support 368 for mounting a radar detector or similar device (not shown) to the mirror mount 302 of this invention. The device support 368 includes a base plate 370 connected by a bolt or screw 160 to the spacer 204 of the coupling structure described above. Four anti-slip pads 372a-d are mounted at the corners of the base plate 370, and a pair of security straps 374, 376 extend above the base plate 370. The ends of security straps 374, 376 are connected to brackets 378 located on opposite sides of the base plate 370, one of which is shown in FIG. 23. A radar detector or similar device may be secured on the device support 368 by placing its bottom surface atop the anti-slip pads 372a-d and wrapping the security straps 374, 376 about its top surface. The security straps 374, 376 may be elastic cords or similar stretchable material so that they firmly engage and retain the radar detector in place.

Figure 24:
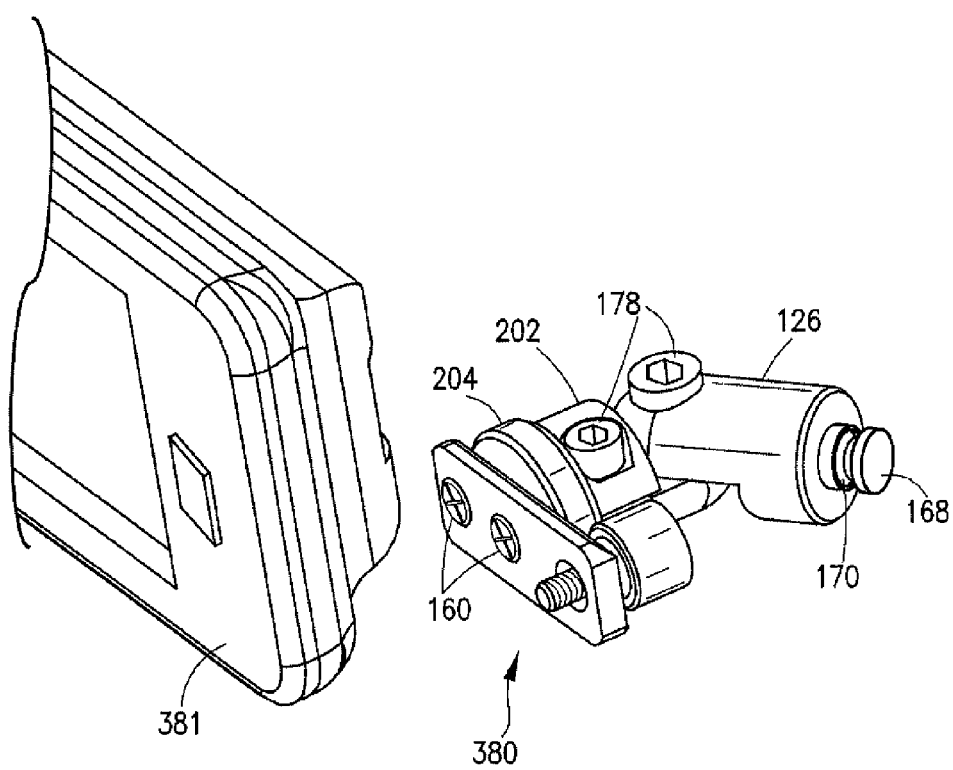
FIG. 24 is a perspective view of the device mounting assembly of this invention connected to a coupling structure in the form of a device support for mounting a cellular telephone or tablet commercially available from Apple, Inc.

Another type of device support 380 is illustrated in FIG. 24 which is particularly intended for mounting a cellular telephone or tablet, commercially available from Apple, Inc. under the marks "iPhone" and "iPad," a portion of one of which is schematically shown and identified with the reference number 381 in FIG. 24. The device support 380 is similar to the "Phone Booth" mount commercially available from Velocomp, LLP based in Boca Raton, Fla., except the device support 380 connects to the spacer 204 of the coupling structure described above by one or more bolts or screws 160.

Figure 25:
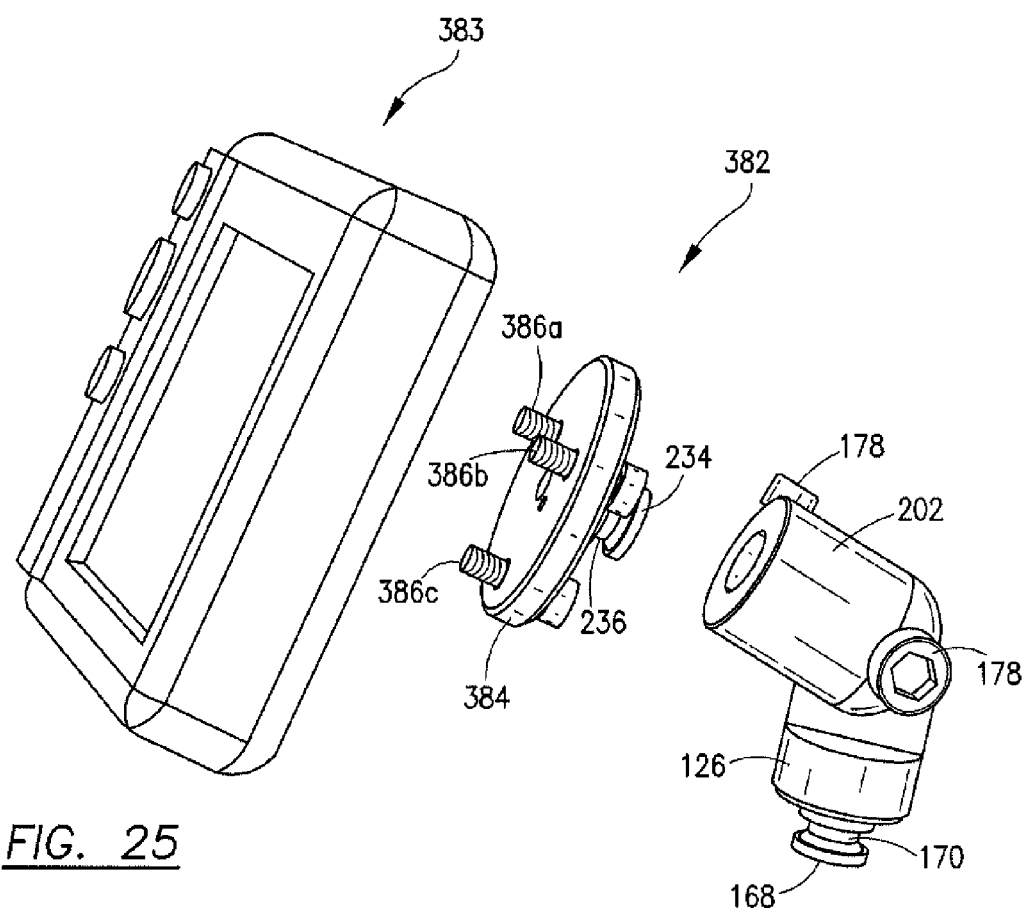
FIG. 25 is a perspective view of the device mounting assembly of this invention connected to a coupling structure in the form of a support for an LCD display.

With reference to FIG. 25, a further embodiment of a device support 382 is illustrated which is intended to support an LCD display 383. In the embodiment shown in FIG. 25, the device support 382 comprises a plate 384 which receives three screws 386a-c adapted to connect to the LCD display 383. An extension 234 projects from the plate 384 for direct engagement with the upper coupler 202, e.g. no spacer 204 is employed. In an alternative embodiment, a spacer 204 may be connected between the plate 384 and upper coupler 202 such as described in connection with a discussion of FIGS. 15-18. The manner of connecting the extension 234 of plate 384 to upper coupler 202 is the same as that for connecting the spacer 204 to upper coupler 202.

Figure 26:
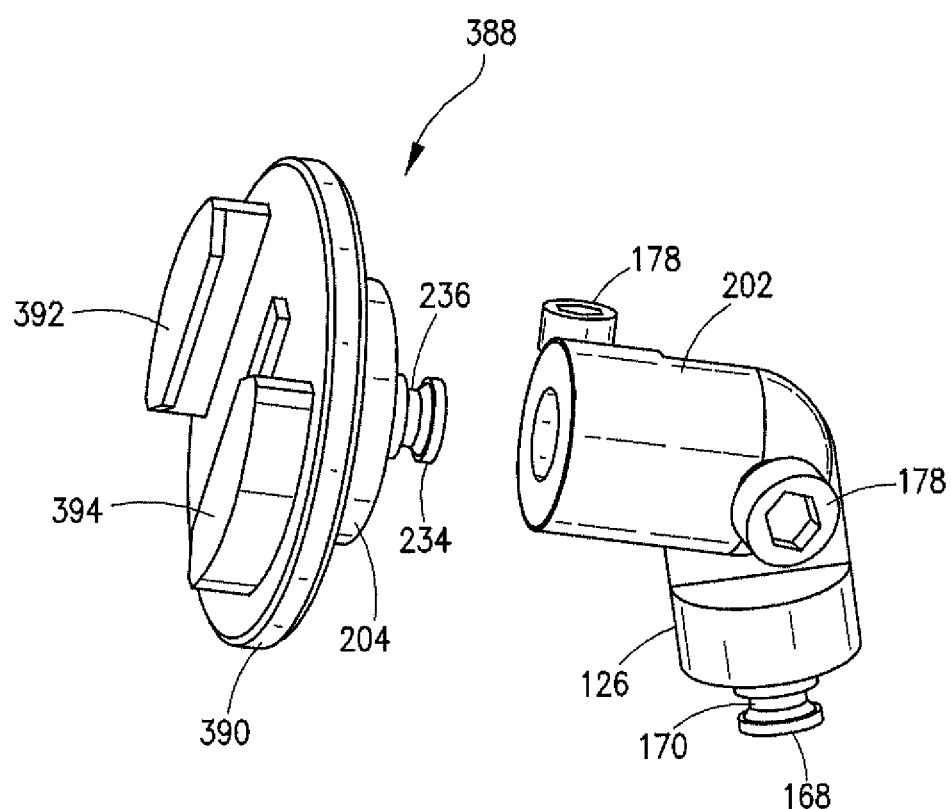
FIG. 26 is a perspective view of the device mounting assembly of this invention connected to a coupling structure in the form of a device support for a camera.

A still further embodiment of a device support 388 is illustrated in FIG. 26. The device support 388 is similar to the mount commercially available under the name and mark "GoPro" from Woodman Labs, Inc. of San Mateo, Calif. The device mount 388 comprises a base plate 390 having a top surface from which a pair of mounting arms 392, 394 project, and a bottom surface that may be mounted to a spacer 204 having an extension 234 for insertion into the upper coupler 202 of the coupling structure described above. A camera (not shown) may be received between and secured by the mounting arms 392, 394.

Each of the device supports 360, 368, 380, 382 and 388 illustrated in FIGS. 22-26 support different types of portable electronic devices on the mirror mount 302 of a motor scooter for ready access by the rider. It should be understood that other device supports may be employed with the mirror mount using the coupling structure of this invention, and those shown in FIGS. 22-26 are for purposes of illustration only.

Threaded connections are employed in the mounts 10, 12, 120, 200 and 300 of this invention to connect the device mounting plates 14 and 122, or device supports 360, 368, 380, 382 and 388, to respective upper couplers 16, 124 or 202, to connect the vehicle mounting elements 22 and 128 to respective lower couplers 18 and 126, and, to connect the upper couplers 124 or 202 and lower coupler 126 to one another. While these threaded connections are generally effective to secure such components together, it has been found that vibration and jarring applied to the mounts 10, 12, 120, 200 and/or 300 during operation of a motorcycle, motorized scooter or other vehicle can loosen such connections over time and cause relative rotation between one or more of the threaded connections discussed above. This potential problem of relative rotation is addressed by the provision of the anti-rotation pins 54, 56, 58 or 244 located on the device mounting plate 14 or 122, the anti-rotation pin 108 of vehicle mounting element 22, the anti-rotation pin 114 on the rod 30, the anti-rotation pin 109 on the lower coupler 18, and, the anti-rotation pins 152, 156 and 230 on the upper coupler 124 or 202. These anti-rotation pins 54-58, 108, 109, 114, 152, 156, 230 and 244 seat within respective blind holes 78, 100, 101, 176, 242 or within through holes 140, as discussed above, to resist disengagement of the components of the mounts 10, 12, 120 and 200 even in the event of loosening of a threaded connection between them.

Another important feature of the anti-rotation pins 54-58, 108, 109, 114, 152, 156, 230 and 244 relates to the performance of the mounts 10, 12, 120 and 200 during an accident or other occasion when a severe force is applied to the mounts 10, 12, 120 or 200 and/or to the vehicle on which they are mounted. In one presently preferred embodiment, each of the device mounting plates 14 and 122, the upper couplers 16, 124 and 202, the lower couplers 18 and 126, and, the vehicle mounting elements 22 and 128 are made of a relatively soft material such as aluminum. The anti-rotation pins 54-58, 108, 109, 114, 152, 156, 230 and 244, on the other hand, may be formed of a material that is harder than aluminum, such as steel, or of material having less hardness than aluminum. For purposes of the present discussion, the term "hardness" refers to the property of a metal which gives it the ability to resist permanent deformation, e.g. being bent, broken or undergoing a change in shape, in response to the application of a load. The greater the hardness of a metal, the more resistant it is to deformation. While the anti-rotation pins 54-58, 108, 109, 114, 152, 156, 230 and 244 function to resist rotation of components during normal operation of the mounts 10, 12, 120 and 200, as described above, in response to the application of a severe force to the mounts 10, 12, 120, 200 or to the vehicle that carries them, shearing occurs at the point of connection of the anti-rotation pins 54-58, 108, 109, 114, 152, 156, 230 or 244 to respective components 14, 16, 18, 22, 122, 124, 126 and 204. If the pins 54-58, 108, 109, 114, 152, 156, 230 and 244 are formed of a material having a hardness greater than that of the components 14, 16, 18, 22, 122, 126 and 204, then shearing occurs in between the blind holes or cavities 78, 100, 101, 124, 176 and 242, or between the through holes 140. Alternatively, if the hardness of the components 14, 16, 18, 22, 122, 126 and 204 exceeds that of the anti-rotation pins 54-58, 108, 109, 114, 152, 156, 230 or 244 then such pins will shear off in response to the application of a force. In either case, relative rotation between respective device mounting plates 14, 122 and upper couplers 16, 124, or 202, between the vehicle mounting elements 22, 128 and the lower couplers 18, 126, or 202, 126, and, between the upper and lower couplers 124, 126, is permitted to the extent that the bolts that connect them together are loosened by such force. In essence, at least some rotation of such components provides "give" in the mounts 10, 12, 120, 200 and 300 so that a portable device carried by the device mounting plates 14 and 122, or cradle 312, does not become a projectile during an accident. By allowing some "give" in the components of mounts 10, 12, 120, 200 and 300 during an accident, the force applied to the portable device tends to allow at least a limited rotation of such device rather than causing it to fly off of the mount 10, 12, 120, 200 and 300 potentially causing injury to the rider or others.

While the invention has been described with reference to a preferred embodiment, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof.

For example, the upper and lower pivots 16, 18 shown in the Figs. are of the type that permit rotation about the axis of the bolts 74 and 98 that mount the shaft 20 to such pivots 16, 18. It should be understood that other types of pivots may be employed, including ball-and-socket type pivots or others that permit motion about multiple axes. Additionally, in the embodiment of FIGS. 15-18, a separate spacer 204 is illustrated having an extension 234 which is connected between the device mounting plate 122 and the upper coupler 202. However, it is contemplated that the extension 234 could be formed on the device mounting plate 122 and the spacer 204 eliminated. Therefore the device mounting plate 122 is considered to "have" an extension either as a result of it being connected to a spacer 204 formed with such extension, or where an extension is integrally formed on or directly connected to the device mounting plate 122 itself.

Therefore, it is intended that the invention not be limited to the particular embodiment disclosed as the best mode contemplated for carrying out this invention, but that the invention will include all embodiments falling within the scope of the appended claims.

What is claimed is:

1. Apparatus for mounting a portable device to the mirror mount of a scooter, the mirror mount including a support rod coupled at one end to the scooter and at the opposite end to a mirror, said apparatus comprising:
 a vehicle mount including a first clamping element and a second clamping element;
 said first clamping element having a first end formed with a first cavity which is effective to engage one portion of the support rod of the mirror mount, said first cavity defining spaced first and second end edges, a second end of said first housing being formed with a slot defining a first clamping section and a mating second clamping section, a first bore partially formed in each of said first and second clamping sections and a cross bore extending between said first and second clamping sections which intersects said first bore;
 said second clamping element having a third end formed with a second cavity which is effective to engage another portion of the support rod of the mirror mount, said second cavity defining spaced third and fourth end edges;
 at least one fastener connected between said first and second clamping elements so that said first and second cavities encircle the support rod of the mirror mount and said first and second end edges of said first clamping element engage respective third and fourth end edges of said second clamping element;
 a first coupler having an extension formed with a circumferentially extending recess, said extension being received within said first bore of said first clamping element and rotatable therein to any position wherein at least a portion of said circumferentially extending recess aligns with said cross bore;
 a mounting element insertable within said cross bore of said first clamping section and into a portion of said circumferentially extending recess which aligns with said cross bore, said mounting element being captured within said circumferentially extending recess of said extension between said first and second end portions thereof, said mounting element being effective to urge said first and second clamping sections toward one another;
 a second coupler connected to said first coupler;
 a device support adapted to support the portable device, said second coupler being connected to said device support.

2. The apparatus of claim 1 in which said device support is a support for cellular telephones.

3. The apparatus of claim 1 in which said device support is a support for cameras.

4. The apparatus of claim 1 in which said device support is a support for LCD displays.

5. The apparatus of claim 1 in which said device support is a support for radar detectors.

6. The apparatus of claim 1 in which one of said first and second couplers is formed with a first anti-rotation pin and the other of said first and second couplers is formed with at least one first cavity, said first and second couplers being connected to one another so that said first anti-rotation pin seats within said at least one first cavity to resist relative rotational movement between said first and second couplers.

7. The apparatus of claim 6 in which said at least one first cavity comprises a number of blind holes, said first anti-rotation pin being positionable into any one of said blind holes, the orientation of said first and second couplers relative to one another being varied depending upon in which one of said blind holes said first anti-rotation pin is seated.

8. The apparatus of claim 7 in which said one of said first coupler and said second coupler having said at least one first cavity is formed of a first material, said first anti-rotation pin being formed of a second material, one of said first and second materials having a hardness greater than the other so that in response to the application of a force to the apparatus one of said first anti-rotation pin and said first or second couplers undergoes shearing causing said first anti-rotation pin to break off or causing said first anti-rotation pin to break through said at least one first cavity thus permitting relative rotation between said first and second couplers.

9. The apparatus of claim 1 in which said device support is a device mounting plate, one of said second coupler and said device mounting plate being formed with a second anti-rotation pin and the other of said second coupler and said device mounting plate being formed with at least one second cavity, said second coupler and said device mounting plate being connected to one another so that said second anti-rotation pin seats within said at least one second cavity to resist relative rotation between said second coupler and said device mounting plate.

10. The apparatus of claim 9 in which said at least one second cavity comprises a number of through bores formed in said device mounting plate, said second anti-rotation pin being formed on said second coupler, said second anti-rotation pin being positionable into any one of said through bores, the position of said second coupler and said device mounting plate relative to one another being varied depending upon in which one of said through bores said second anti-rotation pin is seated.

11. The apparatus of claim 10 in which said one of said second coupler and said device mounting plate having said at least one second cavity being formed of a first material, said second anti-rotation pin being formed of a second material, one of said first and second materials having a hardness greater than the other so that in response to the application of a sufficient force to the apparatus one of said second anti-rotation pin and said second coupler or device mounting plate undergoes shearing causing said second anti-rotation pin to break off or causing said second anti-rotation pin to break through said at least one second cavity thus permitting relative rotation between said second coupler and said device mounting plate.

12. Apparatus for mounting a portable device to the mirror mount of a scooter, the mirror mount including a support rod coupled at one end to the scooter and at the opposite end to a mirror, said apparatus comprising:

a vehicle mount including a first clamping element and a second clamping element;
said first clamping element having a first end formed with a first cavity which is effective to engage one portion of the support rod of the mirror mount, said first cavity defining spaced first and second end edges, a second end of said first housing being formed with a slot defining a first clamping section and a mating second clamping section, a first bore partially formed in each of said first and second clamping sections and a cross bore extending between said first and second clamping sections which intersects said first bore;
said second clamping element having a third end formed with a second cavity which is effective to engage another portion of the support rod of the mirror mount, said second cavity defining spaced third and fourth end edges;
at least one fastener connected between said first and second clamping elements so that said first and second cavities encircle the support rod of the mirror mount and said first and second end edges of said first clamping element engage respective third and fourth end edges of said second clamping element;
coupling structure including an extension having a circumferentially extending recess, said extension being received within said first bore of first clamping element and rotatable therein to any position wherein at least a portion of said circumferentially extending recess aligns with said cross bore;
a mounting element insertable within said cross bore of said first clamping section and into a portion of said circumferentially extending recess of said extension which aligns with said cross bore, said mounting element being captured within said circumferentially extending recess of said extension and being effective to urge said first and second clamping sections toward one another to connect said vehicle mount to said coupling structure;
a device support adapted to support the portable device, said coupling structure being connected to said device support.

13. The apparatus of claim 12 in which said device support is a device mounting plate, one of said coupling structure and said device mounting plate being formed with an anti-rotation pin and the other of said coupling structure and said device mounting plate being formed with at least one cavity, said coupling structure and said device mounting plate being connected to one another so that said anti-rotation pin seats within said at least one cavity to resist relative rotation between said coupling structure and said device mounting plate.

14. The apparatus of claim 13 in which said at least one cavity comprises a number of through bores formed in said device mounting plate, said anti-rotation pin being formed on said coupling structure, said anti-rotation pin being positionable into any one of said through bores, the position of said coupling structure and said device mounting plate relative to one another being varied depending upon in which one of said through bores said anti-rotation pin is seated.

15. The apparatus of claim 13 in which said one of said coupling structure and said device mounting plate having said at least one cavity being formed of a first material, said anti-rotation pin being formed of a second material, one of said first and second materials having a hardness greater than the other so that in response to the application of a force to the apparatus one of said anti-rotation pin and said coupling structure undergoes shearing causing said anti-rotation pin to break off or causing said anti-rotation pin to break through said at least one cavity thus permitting relative rotation between said coupling structure and said device mounting plate.

16. The apparatus of claim 12 in which said coupling structure comprises a first coupler connected to a second coupler, said first coupler being formed with said extension.

17. The apparatus of claim 16 in which said second coupler is connected to said device support.

18. The apparatus of claim 16 in which said second coupler is formed with a slot defining first and second clamping sections, a first bore partially formed in each of said first and second clamping sections and spanning said slot, and a cross bore partially formed in each of said first and second clamping sections which intersects said first bore.

19. The apparatus of claim 18 in which said device support is formed with an extension having a circumferentially extending recess, said extension being insertable within said first bore partially formed in each of said first and second clamping sections of said second coupler and rotatable therein to any position wherein at least a portion of said circumferentially extending recess aligns with said cross bore.

20. The apparatus of claim 19 further including a mounting element insertable within said cross bore and into a portion of said circumferentially extending recess which aligns with said cross bore, said mounting element being captured within said circumferentially extending recess and being effective to urge said first and second clamping sections of said second coupler toward one another to clamp said extension of said device support between them.

21. The apparatus of claim 18 further including a spacer formed with an extension having a circumferentially extending recess, said extension being insertable within said first bore partially formed in each of said first and second clamping sections of said second coupler and rotatable therein to any position wherein at least a portion of said circumferentially extending recess aligns with said cross bore.

22. The apparatus of claim 21 further including a mounting element insertable within said cross bore and into a portion of said circumferentially extending recess which aligns with said cross bore, said mounting element being captured within said circumferentially extending recess and being effective to urge said first and second clamping sections of said second coupler toward one another to clamp said extension of said spacer between them.

23. The apparatus of claim 22 in which said spacer is connected to said device support.

* * * * *